United States Patent
Nishimura

(10) Patent No.: US 12,319,824 B2
(45) Date of Patent: Jun. 3, 2025

(54) INK SET, IMAGE RECORDING METHOD, AND INK COMPOSITION

(71) Applicant: FUJIFILM Corporation, Tokyo (JP)

(72) Inventor: Naoko Nishimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1199 days.

(21) Appl. No.: 17/129,785

(22) Filed: Dec. 21, 2020

(65) Prior Publication Data

US 2021/0108100 A1    Apr. 15, 2021

Related U.S. Application Data

(63) Continuation of application No. PCT/JP2019/031549, filed on Aug. 9, 2019.

(30) Foreign Application Priority Data

Sep. 14, 2018  (JP) .................................. 2018-173026

(51) Int. Cl.
| | |
|---|---|
| C09D 11/40 | (2014.01) |
| B41M 5/00 | (2006.01) |
| B41M 7/00 | (2006.01) |
| C09D 11/107 | (2014.01) |
| C09D 11/322 | (2014.01) |
| C09D 11/326 | (2014.01) |
| C09D 11/54 | (2014.01) |

(52) U.S. Cl.
CPC .......... *C09D 11/40* (2013.01); *B41M 5/0047* (2013.01); *B41M 7/009* (2013.01); *C09D 11/107* (2013.01); *C09D 11/322* (2013.01); *C09D 11/326* (2013.01); *C09D 11/54* (2013.01)

(58) Field of Classification Search
CPC ..... C09D 11/40; C09D 11/322; C09D 11/107; C09D 11/326; C09D 11/54; C09D 11/10; C09D 11/38; B41M 5/0047; B41M 5/0023; B41M 7/009; B41J 2/01
See application file for complete search history.

(56) References Cited

U.S. PATENT DOCUMENTS

| | | |
|---|---|---|
| 6,827,434 B1 | 12/2004 | Katsuragi et al. |
| 9,004,664 B2 | 4/2015 | Yamazaki et al. |
| 10,533,106 B2 | 1/2020 | Kasperchik et al. |
| 2012/0229558 A1 | 9/2012 | Nishizaki et al. |

(Continued)

FOREIGN PATENT DOCUMENTS

| | | |
|---|---|---|
| CN | 103289470 | 9/2013 |
| CN | 107532024 | 1/2018 |

(Continued)

OTHER PUBLICATIONS

"International Search Report (Form PCT/ISA/210) of PCT/JP2019/031549," mailed on Oct. 29, 2019, with English translation thereof, pp. 1-5.

(Continued)

*Primary Examiner* — Sophie Hon
(74) *Attorney, Agent, or Firm* — JCIPRNET

(57) ABSTRACT

An ink set includes a first ink composition containing water, a dispersant, a colorant, and an ampholyte; and a second ink composition containing water, a colorant, and a resin containing an unneutralized acid group.

11 Claims, 2 Drawing Sheets

(56) References Cited

U.S. PATENT DOCUMENTS

| | | | |
|---|---|---|---|
| 2012/0247365 A1* | 10/2012 | Lussier | C09D 11/38 |
| | | | 106/31.13 |
| 2013/0224451 A1 | 8/2013 | Shiono et al. | |
| 2014/0287206 A1 | 9/2014 | Sasada et al. | |
| 2016/0208122 A1 | 7/2016 | Yamazaki | |
| 2018/0265726 A1 | 9/2018 | Yamazaki | |
| 2019/0023922 A1* | 1/2019 | Koyama | C08G 18/792 |

FOREIGN PATENT DOCUMENTS

| | | | | |
|---|---|---|---|---|
| EP | 3851499 B1 * | 8/2024 | ......... | B41M 5/0023 |
| JP | H11256083 | 9/1999 | | |
| JP | 2002172847 | 6/2002 | | |
| JP | 2005059448 | 3/2005 | | |
| JP | 2010058374 | 3/2010 | | |
| JP | 2011063658 | 3/2011 | | |
| JP | 2012187771 | 10/2012 | | |
| JP | 2012219259 | 11/2012 | | |
| JP | 2013181055 | 9/2013 | | |
| JP | 2014070126 | 4/2014 | | |
| JP | 2014185235 | 10/2014 | | |
| JP | 2015124348 | 7/2015 | | |
| JP | 2016132758 | 7/2016 | | |
| JP | 2017019252 | 1/2017 | | |
| JP | 2017132093 | 8/2017 | | |
| JP | 2019011397 | 1/2019 | | |
| JP | 7109563 B2 * | 7/2022 | ......... | B41M 5/0023 |
| WO | 2017014747 | 1/2017 | | |
| WO | WO-2017135089 A1 * | 8/2017 | ............. | B01J 13/14 |

OTHER PUBLICATIONS

"Written Opinion of the International Searching Authority (Form PCT/ISA/237) of PCT/JP2019/031549," mailed on Oct. 29, 2019, with English translation thereof, pp. 1-19.

"Office Action of Japan Counterpart Application" with English translation thereof, issued on Nov. 2, 2021, p. 1-p. 9.

"Search Report of Europe Counterpart Application", issued on Oct. 15, 2021, p. 1-p. 6.

"Office Action of Japan Counterpart Application", issued on Apr. 26, 2022, with English translation thereof, p. 1-p. 4.

"Office Action of China Counterpart Application", issued on Mar. 3, 2022, with partial English translation thereof, p. 1-p. 15.

"Office Action of China Counterpart Application", issued on Aug. 4, 2022, with English translation thereof, p. 1-p. 15.

"Rejection Decision of China Counterpart Application", issued on Nov. 4, 2022, with English translation thereof, p. 1-p. 11.

* cited by examiner

5pt

———
2 mm

6pt

7pt

INK SET, IMAGE RECORDING METHOD, AND INK COMPOSITION

CROSS-REFERENCE TO RELATED APPLICATIONS

This application is a Continuation of PCT International Application No. PCT/JP2019/031549 filed on Aug. 9, 2019, which claims priority under 35 U.S.C § 119(a) to Japanese Patent Application No. 2018-173026 filed on Sep. 14, 2018. Each of the above application(s) is hereby expressly incorporated by reference, in its entirety, into the present application.

BACKGROUND OF THE INVENTION

1. Field of the Invention

The present disclosure relates to an ink set, an image recording method, and an ink composition.

2. Description of the Related Art

Typically, paper (for example, a white background) or the like is frequently used as a recording medium on which an image is recorded. However, in recent years, since the recording medium varies depending on the use mode, it is desirable that an image is recorded on a material that does not necessarily have a white background. For example, in a case where the material for recording an image is colored or the rear side of the material is seen through, a technique of recording an image without impairing the visibility and sharpness of the recorded image is desired.

In order to improve the above-described situation, it has been proposed to form a base using an ink (for example, a white ink) in the related art. For example, an ink that is not chromatic is intentionally used in combination with a chromatic colored ink in some cases for the purpose of expressing the color of the base and enhancing the visibility and the sharpness of the image.

As such a technique, JP2011-063658A describes an ink composition which contains a pigment, polymer particles having a glass transition temperature of 50° C. or higher, and at least one of an amino acid or an amino acid derivative.

Further, JP1999-256083A (JP-H11-256083A) describes an aqueous ink for ink jet recording, which is formed of an aqueous dispersion liquid containing polyester adsorbing a water-insoluble coloring material as a dispersoid, in which the aqueous dispersion liquid is obtained by distilling off a water-soluble organic solvent from a water/water-soluble organic solvent mixed solution containing a) neutralized product of polyester having an acid value of 1 to 100 mgKOH/g, b) water-insoluble coloring material, and c) one or more compounds selected from the group consisting of c1) water-soluble polyhydric hydroxy compound having a boiling point higher than or equal to that of water, c2) compound which is represented by a specific structural formula and substantially soluble in water, an amino acid, and a salt thereof.

SUMMARY OF THE INVENTION

In recent years, a technique of using a plurality of kinds of inks (for example, chromatic inks and inks expressing the colors of bases) in a case where development is made for base materials such as plastic is typically known as an aqueous ink jet technique.

In the above-described technique, a recording method in which chromatic inks are aggregated by a treatment liquid having an aggregation function is adopted in some cases. However, it is considered that degradation of working efficiency due to an increase in number of steps may be a problem because three or more kinds of inks (colored inks, treatment liquids, and inks expressing the colors of bases) having different functions are used in this method. Specifically, for example, in a case where an image is recorded by applying a colored ink onto an ink expressing the color of a base, a step of applying a treatment liquid having an aggregation function is required separately in addition to a step of applying the ink expressing the color of the base and the colored ink, and thus there is a concern that the working efficiency is degraded.

In this case, the treatment liquid is required to aggregate both the ink expressing the color of the base and the colored ink, and thus the aggregation function tends to be insufficient.

An object to be achieved by an embodiment of the present disclosure is to provide an ink set and an image recording method that enable recording of an image by allowing dispersed components to be satisfactorily aggregated without using a so-called treatment liquid having an aggregation function.

Means for achieving the above-described object includes the following aspects.

<1> An ink set comprising: a first ink composition; and a second ink composition, in which the first ink composition contains water, a dispersant, a colorant, and an ampholyte, and the second ink composition contains water, a colorant, and a resin containing an unneutralized acid group.

<2> The ink set according to <1>, in which an acid value of the dispersant contained in the first ink composition is 50 mgKOH/g or less.

<3> The ink set according to <1> or <2>, in which an acid value of the dispersant contained in the first ink composition is 25 mgKOH/g or less.

<4> The ink set according to any one of <1> to <3>, in which the ampholyte contains an amino acid.

<5> The ink set according to any one of <1> to <4>, in which a content of the ampholyte is in a range of 0.03% by mass to 2.0% by mass with respect to a total mass of the first ink composition.

<6> The ink set according to any one of <1> to <5>, in which the resin containing an unneutralized acid group, which is contained in the second ink composition, is a dispersant containing an unneutralized acid group.

<7> The ink set according to any one of <1> to <6>, in which the resin contained in the second ink composition contains a resin having an acid value of 20 mgKOH/g or greater.

<8> The ink set according to any one of <1> to <7>, in which the resin contained in the second ink composition contains a resin having an acid value of 50 mgKOH/g to 200 mgKOH/g.

<9> The ink set according to any one of <1> to <8>, in which an acid value of the resin contained in the second ink composition is greater than an acid value of the dispersant contained in the first ink composition.

<10> The ink set according to any one of <1> to <9>, in which the first ink composition further contains metal oxide particles, an average primary particle diameter of the metal oxide particles is less than 100 nm, and the metal oxide particles contain at least one metal oxide selected from the group consisting of zirconium dioxide, aluminum oxide, silicon dioxide, zinc oxide, and diiron trioxide.

<11> The ink set according to any one of <1> to <10>, in which the ink set is used for ink jet recording.

<12> An image recording method which is performed using the ink set according to any one of <1> to <11>, the method comprising: a first ink applying step of applying the first ink composition onto a base material; and a second ink applying step of applying the second ink composition onto the base material.

<13> The image recording method according to <12>, in which the second ink applying step is performed after the first ink applying step.

<14> The image recording method according to <13>, further comprising: a drying step of heating and drying the first ink composition applied, after the first ink applying step and before the second ink applying step.

<15> The image recording method according to any one of <12> to <14>, in which at least one of the first ink applying step or the second ink applying step is a step of applying an ink composition using an ink jet method.

<16> An ink composition comprising: water; a white pigment; a dispersant having an acid value of 50 mgKOH/g or less; and an ampholyte.

According to the aspects of the present disclosure, it is possible to provide an ink set and an image recording method that enable recording of an image by allowing dispersed components (for example, a colorant) contained in the second ink composition to be satisfactorily aggregated without using a so-called treatment liquid having an aggregation function.

DESCRIPTION OF THE PREFERRED EMBODIMENTS

Figure 1:
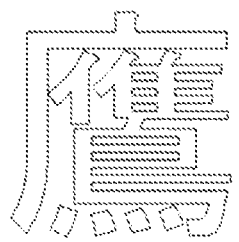
FIG. 1 is a view conceptually showing characters in character images used for evaluation of an aggregating property in examples.
Figure 1:
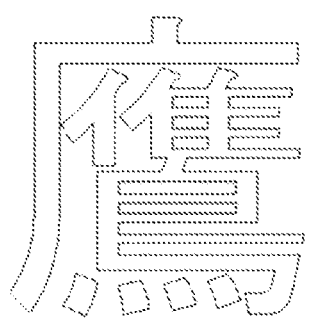
Figure 1:
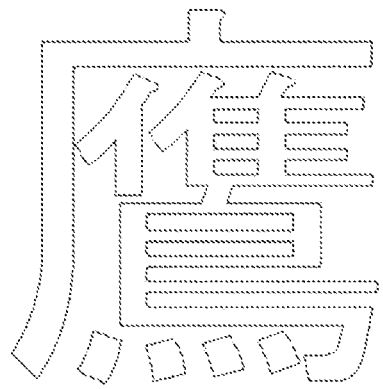

In the present disclosure, a numerical range shown using "to" indicates a range including the numerical values described before and after "to" as a lower limit and an upper limit.

In a numerical range described in a stepwise manner in the present disclosure, an upper limit or a lower limit described in a certain numerical range may be replaced with an upper limit or a lower limit in another numerical range described in a stepwise manner.

In the present disclosure, in a case where a plurality of substances corresponding to respective components in a composition are present, the amount of the respective components in the composition indicates the total amount of the plurality of substances present in the composition unless otherwise specified.

In the present disclosure, the meaning of the term "step" includes not only an independent step but also a step whose intended purpose is achieved even in a case where the step is not clearly distinguished from other steps.

In the present disclosure, "image recording" or "recording of an image" indicates that an image is drawn on a base material using a first ink composition and a second ink composition.

In the present disclosure, the "image quality" indicates the definition of an image.

In the present disclosure, a combination of preferred embodiments is a more preferred embodiment.

<<Ink Set>>

An ink set according to the present disclosure contains a first ink composition containing water, a dispersant (in the present specification, also referred to as a first dispersant), a colorant, and an ampholyte; and a second ink composition containing water, a colorant, and a resin containing an unneutralized acid group.

As described above, it is considered that, for example, in a case where an image is recorded with the configuration described in JP2011-063658A or JP1999-256083A (JP-H11-256083A), an ink expressing the color of a base does not have an aggregation function with respect to a colored ink or has a degraded aggregation function. Further, in a case where an image is recorded by a method of using a treatment liquid having an aggregation function, in addition to the ink expressing the color of the base and the colored ink, a step of applying the treatment liquid is indispensable in addition to a step of applying the ink expressing the color of the base and the colored ink. Therefore, the working efficiency is unlikely to be improved due to a large number of steps.

Here, the above-described problem is solved based on the following findings obtained by intensive examination conducted by the present inventors on the aggregation function in a case of aggregating the second ink composition (colored ink) with the first ink composition (for example, a white ink) incorporating the aggregation function.

Since the first ink composition according to the embodiment of the present disclosure contains an ampholyte that can be acidic or basic depending on the pH of the ambient environment, the ampholyte becomes a cation by designing the pH of the first ink composition in the neutral to acidic range. Further, the cation easily acts on the resin containing an unneutralized acid group, which is contained in the second ink composition, so that the second ink composition can be aggregated.

As described above, the ink set according to the embodiment of the present disclosure enables recording of an image by allowing dispersed components in the second ink composition to be aggregated using the first ink composition without using a treatment liquid for aggregating the dispersed components in the ink.

The first ink composition according to the embodiment of the present disclosure has a function of aggregating the second ink composition. In this manner, examples of the application of the ink set according to the embodiment of the present disclosure include an application of using a white ink as the first ink composition and using a colored ink as the second ink composition. In this case, a chromatic image can be recorded on a white base using two ink compositions without separately using a treatment liquid.

As a result, the number of work steps can be reduced as compared with methods of the related art, and thus the working efficiency is improved.

<First Ink Composition>

The first ink composition according to the embodiment of the present disclosure contains water, a dispersant (in this specification, the dispersant contained in the first ink composition is also referred to as a first dispersant), a colorant, and an ampholyte.

The first ink composition according to the embodiment of the present disclosure has an excellent function of aggregating the dispersed components in the second ink composition.

Further, the pH of the first ink composition according to the embodiment of the present disclosure can be designed in the neutral to acidic range by allowing the first ink composition to contain an ampholyte having the function of an amphoteric ion.

In this manner, the aggregating property of the dispersed components such as the colorant contained in the second ink composition can be improved. Further, resin particles described below can be used in the form of a latex or the like. Further, metal oxide particles can be added. By addition of the latex and the metal oxide particles, the film quality performance and the storage stability of the first ink composition can be improved, and the selection range of the ink formulation can be widened.

(Dispersant)

The first ink composition contains a dispersant. In this manner, the dispersibility of the colorant in the first ink composition can be improved, and the storage stability of the first ink composition can be satisfactorily maintained.

As the first dispersant, any of a polymer dispersant or a low-molecular-weight surfactant-type dispersant may be used. Further, as the polymer dispersant, any of a water-soluble dispersant or a water-insoluble dispersant may be used.

—Acid Value—

The acid value of the first dispersant contained in the first ink composition according to the embodiment of the present disclosure is preferably 50 mgKOH/g or less. In a case where the acid value of the first dispersant contained in the first ink composition is 50 mgKOH/g or less, the storage stability is excellent.

In a case where an ampholyte is selected as an aggregating agent that aggregates the ink, and the acid value of the first dispersant contained in the first ink composition is set to 50 mgKOH/g or less, the reaction between the ampholyte and the first dispersant can be further suppressed. Therefore, even in a case where the aggregation function is imparted to the first ink composition, the dispersed components (for example, the colorant) contained in the first ink composition are less likely to be aggregated during storage, and thus the storage stability of the first ink composition can be further improved.

By setting the acid value of the first dispersant contained in the first ink composition to 50 mgKOH/g or less, the first ink composition has a more excellent function of aggregating the second ink composition (for example, the colored ink), and the aggregation of the dispersed components (for example, the colorant) contained in the first ink composition can be more significantly suppressed.

From the above-described viewpoint, the acid value of the first dispersant is preferably 30 mgKOH/g or less and more preferably 25 mgKOH/g or less. Further, the lower limit of the acid value may be 0 mgKOH/g, but is preferably 5 mgKOH/g or greater and more preferably 10 mgKOH/g or greater. The lower limit of the acid value may be 0 mgKOH/g, but in a case where the amine value described below is 0 mgKOH/g, the acid value is preferably greater than 0 mgKOH/g.

Further, the acid value of the dispersant can be measured by titration with an indicator. Specifically, the acid value thereof can be calculated by measuring the milligrams of potassium hydroxide that neutralizes the acid component in 1 g of the solid content of the dispersant in conformity with the method described in JIS K 0070:1992.

It is preferable that the first dispersant contained in the first ink composition contains a salt of an acid group from the viewpoint of the dispersibility.

Examples of the salt of the acid group include salts of sulfonic acid, carboxylic acid, phosphoric acid, and phosphonic acid. Among these, a salt of sulfonic acid and a salt of carboxylic acid are preferable.

As the kind of salt, alkali metal salts are preferable. Among these, salts of sodium and potassium are preferable.

—Amine Value—

The amine value of the first dispersant contained in the first ink composition is preferably in a range of 0 mgKOH/g to 50 mgKOH/g.

In a case where the amine value is 50 mgKOH/g or less, the dispersion stability of the dispersed components in the first ink composition can be satisfactorily maintained.

From the same viewpoint as described above, the amine value of the first dispersant is more preferably 45 mgKOH/g or less and still more preferably 30 mgKOH/g or less.

The amine value may be 0 mgKOH/g, but in a case where the acid value is 0 mgKOH/g, the amine value is preferably greater than 0 mgKOH/g.

Further, the amine value shows the total amount of a free base and a base and is expressed by the milligrams of potassium hydroxide equivalent to hydrochloric acid required to neutralize 1 g of a sample.

The amine value is a value measured by a method in conformity with JIS K7237:1995.

—Weight-Average Molecular Weight of First Dispersant—

The weight-average molecular weight of the first dispersant is preferably in a range of 10000 to 50000.

In a case where the weight-average molecular weight thereof is 10000 or greater, the amount of water-soluble components can be effectively suppressed. Further, in a case where the weight-average molecular weight thereof is 50000 or less, the dispersibility can be enhanced.

From the same viewpoint as described above, the weight-average molecular weight of the first dispersant is more preferably in a range of 15000 to 45000 and still more preferably in a range of 20000 to 40000.

The weight-average molecular weight is a value measured by gel permeation chromatography (GPC).

The measurement according to GPC is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 μl, and a measurement temperature of 40° C. using a differential refractive index (RI) detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

A commercially available product may be used as the first dispersant, and examples thereof include ARON (registered trademark) A6330 (manufactured by Toagosei Co., Ltd., solid content: 40% by mass, acid value: 20 mgKOH/g, amine value: 0 mgKOH/g), BYK190 (manufactured by BYK Chemie Japan KK, solid content: 40% by mass, acid value: 10 mgKOH/g, amine value: 0 mgKOH/g), EFKA (registered trademark) PX4701 (manufactured by BASF SE, solid content: 100% by mass, acid value: 0 mgKOH/g, amine value: 40 mgKOH/g), BYK2012 (manufactured by BYK Chemie Japan KK, solid content: 40% by mass, acid value: 7 mgKOH/g, amine value: 7 mgKOH/g), BYK ANTI- TERRA-250 (manufactured by BYK Chemie Japan KK, solid content: 70% by mass, acid value: 46 mgKOH/g, amine value: 41 mgKOH/g), A6012 (manufactured by Toagosei Co., Ltd., solid content: 40% by mass, acid value: 14 mgKOH/g, amine value: 0 mgKOH/g), and BYK-2010 (manufactured by BYK Chemie Japan KK, solid content: 40% by mass, acid value: 20 mgKOH/g, amine value: 0 mgKOH/g). Here, the first dispersant in the present disclosure is not limited thereto.

Specific examples of the first dispersant include the followings. Here, the first dispersant in the present disclosure is not limited thereto.

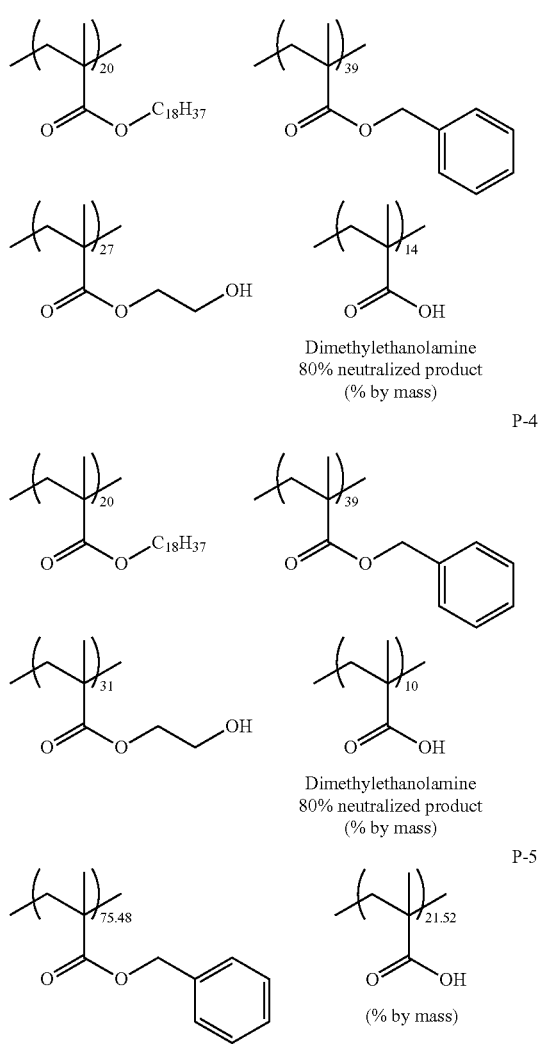

The content of the first dispersant is preferably in a range of 0.5% by mass to 20% by mass, more preferably in a range of 1.0% by mass to 15% by mass, and still more preferably in a range of 1.5% by mass to 10% by mass with respect to the content of the colorant contained in the first ink composition.

The content of the first dispersant contained in the first ink composition is preferably in a range of 0.01% by mass to 5% by mass, more preferably in a range of 0.01% by mass to 4% by mass, and still more preferably in a range of 0.01% by mass to 3% by mass with respect to the total mass of the first ink composition.

(Ampholyte)

The first ink composition according to the embodiment of the present disclosure contains an ampholyte.

In this manner, the aggregating property of the dispersed components in the second ink composition can be enhanced, and a high-definition image can be obtained.

Examples of the ampholyte in the present disclosure include an amino acid, hydrogen phosphate (for example, alkali metal dihydrogen phosphate such as sodium dihydrogen phosphate), hydrogen carbonate (for example, alkali metal hydrogen carbonate such as sodium hydrogen carbonate), bisulfite (for example, alkali metal bisulfite such as sodium bisulfite), aluminum hydroxide, protein, and gelatin.

The ampholyte may be a salt as long as the effects of the present disclosure are not impaired, but it is preferable that the ampholyte is not a salt.

It is preferable that the first ink composition contains a pigment (particularly, titanium oxide) from the viewpoint that salting-out of the pigment contained in the first ink composition can be prevented by using an ampholyte that is not a salt so that the dispersion can be made.

Further, the "salt" in the ampholyte of the present disclosure indicates a compound in which an anion derived from an acid and a cation derived from a base are ionically bonded.

Examples of the ampholyte that is not a salt include amino acids and proteins.

Among these, from the viewpoint of avoiding the salting-out described above, it is preferable that the ampholyte is an amino acid.

Examples of the amino acids in the present disclosure include lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine. Among these, glutamine, glutamic acid, isoleucine, phenylalanine, and serine are preferable, and isoleucine, phenylalanine, and serine are more preferable.

The content of the ampholyte is preferably in a range of 0.02% by mass to 3.0% by mass with respect to the total mass of the first ink composition.

It is preferable that the content of the ampholyte is 0.02% by mass or greater with respect to the total mass of the first ink composition from the viewpoint that the dispersed components in the second ink composition can be more satisfactorily aggregated.

It is preferable that the content of the ampholyte is 3.0% by mass or less with respect to the total mass of the first ink composition from the viewpoint that the dispersibility of the dispersed components in the first ink composition can be improved, and the storage stability can be satisfactorily maintained.

From the same viewpoint as described above, the content of the ampholyte is more preferably in a range of 0.02% by mass to 2.5% by mass, still more preferably in a range of 0.03% by mass to 2.0% by mass, and particularly preferably in a range of 0.03% by mass to 0.6% by mass.

(Colorant)

The first ink composition according to the embodiment of the present disclosure contains a colorant.

As the colorant contained in the first ink composition, known dyes, pigments, and the like can be used without particular limitation. Among these, from the viewpoint of the ink colorability, a colorant that is almost insoluble or hardly soluble in water is preferable. Specific examples thereof include various pigments, dispersed dyes, oil-soluble dyes, and coloring agents that form J-aggregates. Further, pigments are more preferable from the viewpoint of the light fastness.

The pigment is not particularly limited, and an inorganic pigment or an organic pigment can be used, but an inorganic pigment is preferable.

Examples of the inorganic pigment include a white pigment (such as titanium oxide, iron oxide, calcium carbonate, barium sulfate, or aluminum hydroxide), barium yellow, cadmium red, chrome yellow, and carbon black. Among these, from the viewpoint of concealability, a white pigment and carbon black are preferable, a white pigment is more preferable, and titanium oxide is still more preferable. In particular, titanium oxide is a pigment which is unlikely to obtain dispersibility, but titanium oxide can be satisfactorily dispersed in the first ink composition according to the embodiment of the present disclosure.

In addition, particles having a large refractive index are preferable from the viewpoint of concealability. The refractive index is preferably 2.0 or greater. Further, titanium oxide particles are preferable as the particles having a large refractive index.

As titanium oxide, any of an anatase type, a rutile type, a brookite type, and the like can be used. Among these, the rutile type is preferable from the viewpoint of the refractive index. Further, the rutile type has an advantage that the influence on resin components, resin base materials, and the like is small because of a weaker photocatalytic action than that of the anatase type or the brookite type.

In the present disclosure, the "refractive index" indicates a value measured by ellipsometry using visible light having a wavelength of 550 nm at a temperature of 23° C., unless otherwise specified.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the azo pigment include azo lake, an insoluble azo pigment, a condensed azo pigment, and a chelated azo pigment.

Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment.

Examples of the chelate dye include a basic dye-type chelate and an acid dye-type chelate.

It is preferable that the first ink composition is a white ink containing a white pigment.

[Average Primary Particle Diameter]

From the viewpoints of the concealability and the jetting stability, the average primary particle diameter of the pigment particles is preferably in a range of 150 nm to 400 nm and more preferably in a range of 200 nm to 300 nm.

The average primary particle diameter of the pigment and the metal oxide particles described later can be measured by the following measuring method.

The state where the pigment and the metal oxide particles are present can be measured using a high-resolution electron energy loss spectroscopic electron microscope (HREELS-TEM). HREELS-TEM is a method of combining a high-resolution transmission electron microscope (TEM) and electron energy loss spectroscopy (EELS) that can measure the electronic structure, the composition, and the like based on the energy distribution spectrum of electrons that have passed through the sample. In this manner, qualitative and quantitative analysis of light elements that are difficult to measure with a typical electron microscopes can be performed.

Specifically, a coating film of an ink composition having a thickness of approximately 0.3 mm to 0.6 mm is prepared using a hand coating bar and an ink composition to perform STEM-EELS analysis with a field emission electron microscope (HRTEM), the EELS intensity map is divided into 5 nm intervals on the STEM image with respect to the total thickness of the coating film, and EELS spectra are acquired from each divided area. Further, the average primary particle diameter of the pigment and the metal oxide particles is acquired by measuring the long diameters of 300 independent particles that do not overlap each other in the image in which the acquired EELS spectra are expanded at a magnification of 100000 times using a transmission electron microscope (for example, 1200EX (manufactured by JEOL Ltd.)) and calculating the average value thereof as an arithmetic average particle diameter.

[Content]

The first ink composition according to the embodiment of the present disclosure may contain only one or two or more kinds of colorants.

Further, it is preferable that the pigment contains titanium oxide particles, and the content of the titanium oxide particles is preferably 20% by mass or greater, more preferably 50% by mass or greater, and still more preferably 80% by mass or greater with respect to the total mass of the pigment. The upper limit of the content thereof is not particularly limited and may be 100% by mass or less.

The content of the colorant is preferably in a range of 1% by mass to 20% by mass, more preferably in a range of 3% by mass to 18% by mass, and still more preferably in a range of 5% by mass to 15% by mass with respect to the total mass of the first ink composition.

(Water)

The first ink composition contains water.

As water, for example, ion exchange water, distilled water, or the like can be used.

The content of water is preferably in a range of 50% by mass to 90% by mass and more preferably in a range of 60% by mass to 80% by mass with respect to the total mass of the first ink composition.

(Metal Oxide Particles)

The first ink composition according to the embodiment of the present disclosure may contain metal oxide particles other than the pigment.

As the metal oxide particles, particles having an average primary particle diameter smaller than that of the pigment are preferable.

The pH of the first ink composition according to the embodiment of the present disclosure can be designed in the neutral to acidic range by allowing the first ink composition to contain an ampholyte having the function of an amphoteric ion.

In this manner, the metal oxide particles can be added. In a case where the first ink composition contains metal oxide particles as a dispersion assistant, the pigment contained in the first ink composition can be more satisfactorily dispersed, and the storage stability of the first ink composition can be further improved.

The average primary particle diameter of the metal oxide particles is preferably less than 100 nm.

In this manner, the dispersibility of the dispersed components in the first ink composition can be improved.

From the same viewpoint as described above, the average primary particle diameter of the metal oxide particles is more preferably 75 nm or less and still more preferably 50 nm or less.

Further, from the viewpoint of the dispersibility of the dispersed components in the first ink composition, the average primary particle diameter of the metal oxide particles is preferably 20 nm or greater and more preferably 30 nm or greater.

Further, the average primary particle diameter of the metal oxide particles can be measured by the method described above.

The metal oxide particles in the present disclosure may contain, for example, an oxide of at least one metal selected from the group consisting of zirconium, aluminum, silicon, zinc, and iron and preferably at least one selected from the group consisting of zirconium dioxide, aluminum oxide, silicon dioxide, zinc oxide, and diiron trioxide.

Among these, from the viewpoint of the dispersibility, particles containing zirconium dioxide or aluminum oxide are more preferable, and particles containing zirconium dioxide are most preferable.

It is preferable that the metal oxide particles contained in the first ink composition according to the embodiment of the present disclosure have, for example, an average primary particle diameter of less than 100 nm and contain an oxide of at least one metal selected from the group consisting of zirconium, aluminum, silicon, zinc, and iron and more preferable that the metal oxide particles have an average primary particle diameter of less than 100 nm and contains at least one metal oxide selected from the group consisting of zirconium dioxide, aluminum oxide, silicon dioxide, zinc oxide, and diiron trioxide.

<Resin Particles>

The first ink composition according to the embodiment of the present disclosure may contain resin particles.

The resin particles in the present disclosure may be used, for example, in the form of a latex that is a dispersion in which a resin is dispersed in water in the form of particles. By adding the resin particles in the form of a latex, the film quality performance in a case of film formation can be improved.

Here, the concept of the latex includes both an emulsified state (emulsion) in which a water-insoluble polymer is dispersed in an aqueous medium in a liquid state and a dispersed state (suspension) in which a water-insoluble polymer is dispersed in an aqueous medium in a solid state.

[Resin]

Examples of the resin in the resin particles include an acrylic resin, an epoxy resin, a polyether resin, a polyamide resin, an unsaturated polyester resin, a phenol resin, a silicone resin, a fluororesin, a polyvinyl resin (such as vinyl chloride, vinyl acetate, polyvinyl alcohol, or polyvinyl butyral), an alkyd resin, a polyester resin (such as a phthalic acid resin), and an amino material (such as a melamine resin, a melamine formaldehyde resin, an aminoalkyd co-condensation resin, or a urea resin).

Among the above-described resins, as the resin particles, particles of an acrylic resin, a polyether resin, a polyester resin, and a polyolefin resin are preferable. Further, from the viewpoint of improving the concealability, particles of an acrylic resin are more preferable.

Further, in the present specification, the acrylic resin indicates a resin having a constitutional unit derived from (meth)acrylic acid or a (meth)acrylate compound. The acrylic resin may have a constitutional unit other than the constitutional unit derived from the (meth)acrylic acid or the (meth)acrylate compound.

Further, the resin forming the resin particles may be a copolymer having two or more kinds of constitutional units constituting the resins exemplified above or a mixture of two or more kinds of the resins. Further, the resin particles may be formed of a mixture of two or more kinds of resins and may be composite resin particles obtained by laminating two or more kinds of resins in the form of, for example, a core and a shell.

As the resin particles, resin particles obtained by a phase-transfer emulsification method are preferable and particles of a self-dispersing resin (self-dispersing resin particles) described below are more preferable.

Here, the self-dispersing resin indicates a water-insoluble resin which may enter a dispersed state in an aqueous medium by a functional group (particularly, an acidic group of a carboxy group or the like or a salt thereof) contained in the resin itself in a case where the resin has entered the dispersed state according to the phase-transfer emulsification method in the absence of a surfactant.

In addition, the term "water-insoluble" indicates that the amount of substance to be dissolved in 100 parts by mass of water (25° C.) is less than 5.0 parts by mass (preferably less than 1.0 parts by mass).

As the phase-transfer emulsification method, a method of dissolving or dispersing a resin in a solvent (for example, a water-soluble solvent), putting the solution into water without adding a surfactant thereto, stirring and mixing the solution, and removing the solvent in a state in which a salt-forming group (for example, an acidic group such as a carboxy group) contained in the resin is neutralized, to obtain an aqueous dispersion in an emulsified or dispersed state is exemplified.

The self-dispersing resin particles can be selected from among self-dispersing resin particles described in paragraphs 0090 to 0121 of JP2010-064480A and paragraphs 0130 to 0167 of JP2011-068085A and then used. Particularly, it is preferable that particles having a glass transition temperature of higher than 120° C. are selected from among self-dispersing resin particles described in the same publications and then used.

Self-dispersing resin particles containing a carboxy group are preferable as the self-dispersing resin particles.

As the form of the self-dispersing resin particles containing a carboxy group, a form in which particles formed of a resin having a constitutional unit derived from an unsaturated carboxylic acid (preferably (meth)acrylic acid) is more preferable.

As the form of the self-dispersing resin particles containing a carboxy group, a form in which particles formed of a resin having a constitutional unit containing an alicyclic group, a constitutional unit containing an alkyl group, and a constitutional unit derived from an unsaturated carboxylic acid (preferably (meth)acrylic acid) is still more preferable.

The content of the constitutional unit containing an alicyclic group in the above-described resin (the total content in a case where two or more kinds of constitutional units are present) is preferably in a range of 3% by mass to 95% by mass, more preferably in a range of 5% by mass to 75% by mass, and still more preferably in a range of 10% by mass to 50% by mass with respect to the total mass of the resin.

The content of the constitutional unit containing an alkyl group in the above-described resin (the total content in a case where two or more kinds of constitutional units are present) is preferably in a range of 5% by mass to 90% by mass, more preferably in a range of 10% by mass to 85% by mass, still more preferably in a range of 20% by mass to 80% by mass, even still more preferably in a range of 30% by mass to 75% by mass, and even still more preferably in a range of 40% by mass to 75% by mass with respect to the total mass of the resin.

The content of the constitutional unit derived from unsaturated carboxylic acid (preferably (meth)acrylic acid) in the above-described resin (the total content in a case where two or more kinds of constitutional units are present) is preferably in a range of 2% by mass to 30% by mass, more preferably in a range of 5% by mass to 20% by mass, and still more preferably in a range of 5% by mass to 15% by mass with respect to the total mass of the resin.

Further, a form in which the constitutional unit containing an alicyclic group is changed into a constitutional unit containing an aromatic group or a form which has a constitutional unit containing an aromatic group in addition to the constitutional unit containing an alicyclic group, in the "still more preferable form of the self-dispersing resin particles containing a carboxy group" described above, is also preferable as the form of self-dispersing resin particles containing a carboxy group.

In both forms, the total content of the constitutional unit containing an alicyclic group and the constitutional unit containing an aromatic group is preferably in a range of 3% by mass to 95% by mass, more preferably in a range of 5% by mass to 75% by mass, and still more preferably in a range of 10% by mass to 50% by mass with respect to the total amount of the resin.

It is preferable that the constitutional unit containing an alicyclic group is a constitutional unit derived from alicyclic (meth)acrylate.

Examples of the alicyclic (meth)acrylate include monocyclic (meth)acrylate, bicyclic (meth)acrylate, and tricyclic (meth)acrylate.

Examples of the monocyclic (meth)acrylate include cycloalkyl (meth)acrylate in which the number of carbon atoms in a cycloalkyl group is in a range of 3 to 10, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of the bicyclic (meth)acrylate include isobornyl (meth)acrylate and norbornyl (meth)acrylate.

Examples of the tricyclic (meth)acrylate include adamantyl (meth)acrylate, dicyclopentanyl (meth)acrylate, and dicyclopentenyloxyethyl (meth)acrylate.

These may be used alone or in the form of a mixture of two or more kinds thereof.

Among these, from the viewpoints of the fixing property, the blocking resistance, and the dispersion stability of the self-dispersing resin particles, bicyclic (meth)acrylate or tri- or higher cyclic polycyclic (meth)acrylate is preferable; and isobornyl (meth)acrylate, adamantyl (meth)acrylate, or dicyclopentanyl (meth)acrylate is more preferable.

As the constitutional unit containing an aromatic group, a constitutional unit derived from an aromatic group-containing monomer is preferable.

Examples of the aromatic group-containing monomer include an aromatic group-containing (meth)acrylate monomer (such as phenoxyethyl (meth)acrylate, benzyl (meth) acrylate, or phenyl (meth)acrylate) and a styrene compound.

Among these, from the viewpoints of the balance between the hydrophilicity and the hydrophobicity of the resin chain and the ink fixing property, an aromatic group-containing (meth)acrylate monomer is preferable; phenoxyethyl (meth) acrylate, benzyl (meth)acrylate, or phenyl (meth)acrylate is more preferable; and phenoxyethyl (meth)acrylate or benzyl (meth)acrylate is still more preferable.

As the constitutional unit containing an alkyl group, a constitutional unit derived from an alkyl group-containing monomer is preferable.

Examples of the alkyl group-containing monomer include alkyl (meth)acrylate such as methyl (meth)acrylate, ethyl (meth)acrylate, isopropyl (meth)acrylate, n-propyl (meth) acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer containing a hydroxyl group such as hydroxymethyl (meth) acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; dialkylaminoalkyl (meth)acrylate such as dimethylamonoethyl (meth)acrylate; and (meth)acrylamide, for example, N-hydroxyalkyl (meth)acrylamide such as N-hydroxymethyl (meth)acrylamide, N-hydroxyethyl (meth)acrylamide, or N-hydroxybutyl (meth)acrylamide, and N-alkoxyalkyl (meth)acrylamide such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, or N-(n-, iso) butoxyethyl (meth)acrylamide.

Among these, alkyl (meth)acrylate is preferable; alkyl (meth)acrylate in which the number of carbon atoms in an alkyl group is in a range of 1 to 4 is more preferable; methyl (meth)acrylate, ethyl (meth)acrylate, isopropyl (meth)acrylate, or butyl (meth)acrylate is still more preferable; and methyl (meth)acrylate is even still more preferable.

The weight-average molecular weight of the resin constituting the resin particles (preferably the self-dispersing resin particles, the same applies hereinafter) is preferably in a range of 3000 to 200000, more preferably in a range of 5000 to 150000, and still more preferably in a range of 10000 to 100000.

In a case where the weight-average molecular weight thereof is 3000 or greater, the amount of water-soluble components can be effectively suppressed. Further, the self-dispersion stability can be improved by setting the weight-average molecular weight thereof to 200000 or less.

The weight-average molecular weight of the resin forming the resin particles can be measured by the method described above.

From the viewpoints of the self-dispersibility and the aggregation rate, the resin constituting the resin particles is preferably a resin having an acid value of 100 mgKOH/g or less and more preferably a resin having an acid value of 25 mgKOH/g to 100 mgKOH/g.

The volume average particle diameter of the resin particles is preferably in a range of 1 nm to 200 nm, more preferably in a range of 1 nm to 150 nm, still more preferably in a range of 1 nm to 100 nm, and particularly preferably in a range of 1 nm to 10 nm. In a case where the volume average particle diameter thereof is 1 nm or greater, the manufacturing suitability is improved. Further, in a case where the volume average particle diameter is 200 nm or less, the storage stability is improved. Further, the particle size distribution of resin particles is not particularly limited, and any of resin particles having a wide particle size distribution or resin particles having a monodispersed particle size distribution may be used.

In the present disclosure, the volume average particle diameter of the resin particles can be acquired by performing measurement according to a dynamic light scattering method using a nanotrac particle size distribution measurement apparatus UPA-EX150 (manufactured by Nikkiso Co., Ltd.).

From the viewpoint of improving the concealability, the refractive index of the resin particles is preferably in a range of 1.0 to 1.7.

The resin particles may be used alone or in combination of two or more kinds thereof.

The content of the resin particles (preferably self-dispersing resin particles) in the first ink composition (the total content in a case where two or more kinds of particles are present) is not particularly limited, but is preferably in a range of 1.0% by mass to 12.0% by mass, more preferably in a range of 3.0% by mass to 10.0% by mass, and still more preferably in a range of 5.0% by mass to 10.0% by mass with respect to the total mass of the first ink composition.

In a case where the content thereof is 5.0% by mass or greater, the concealability of the image is further improved.

In a case where the content thereof is 10.0% by mass or less, the jetting stability of the first ink composition can be further improved, and it is also advantageous in that the generation of precipitates in a low temperature environment is suppressed.

Hereinafter, specific examples of the resin particles will be described, but the present disclosure is not limited thereto. Further, the values in the parentheses indicate the mass ratio of the copolymer components.

Copolymer of methyl methacrylate/isobornyl methacrylate/methacrylic acid/sodium methacrylate (70/20/5/5), Tg: 150° C.

Joncryl (registered trademark) JDX-C3080 (manufactured by Johnson Polymers, Ltd.), Tg: 130° C.

TREPEARL (registered trademark) EP, manufactured by Toray Industries, Inc., Tg: 190° C.

TREPEARL (registered trademark) PES, manufactured by Toray Industries, Inc., Tg: 225° C.

From the viewpoint of the concealability of an image to be obtained, the content of the resin particles contained in the first ink composition is preferably 1% by mass or greater, more preferably 3% by mass or greater, and still more preferably 4% by mass or greater with respect to the total mass of the first ink composition according to the embodiment of the present disclosure.

Further, from the viewpoint of the jetting stability, the content thereof is preferably 15% by mass or less and more preferably 12% by mass or less.

Examples of the resin of the resin particles in the present disclosure include the following resins. Further, the proportion of each constitutional unit in the following formula is on a mass basis.

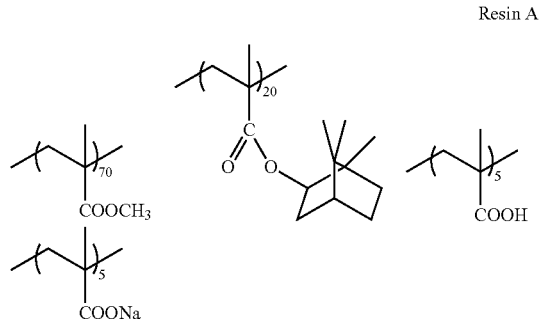

Resin A

<Water-Soluble Solvent>

It is preferable that the first ink composition contains at least one water-soluble solvent.

In this manner, the effect of suppressing drying of the first ink composition or the effect of wetting the first ink composition can be obtained.

The water-soluble solvent which may be contained in the first ink composition can be used, for example, as an anti-drying agent that prevents clogging due to aggregates formed by the first ink composition being attached to an ink jet port of an injection nozzle and being dried.

From the viewpoints of suppressing drying and performing wetting, as the water-soluble solvent contained in the first ink composition, a water-soluble solvent having a lower vapor pressure than that of water is preferable.

In addition, the boiling point of the water-soluble solvent at 1 atm (1013.25 hPa) is preferably in a range of 80° C. to 300° C. and more preferably in a range of 120° C. to 250° C.

As the anti-drying agent, a water-soluble solvent which has a lower vapor pressure than that of water is preferable.

Specific examples of such a water-soluble solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane.

Among these, polyhydric alcohol such as glycerin or diethylene glycol is preferable as the anti-drying agent.

The anti-drying agent may be used alone or in combination of two or more kinds thereof. The content of the anti-drying agent is preferably in a range of 10% by mass to 50% by mass with respect to the total mass of the first ink composition.

The water-soluble solvent may be used for adjusting the viscosity of the first ink composition in addition to the purpose of use described above.

Specific examples of the water-soluble solvent which can be used for adjusting the viscosity include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

In this case, the water-soluble solvent may also be used alone or in combination of two or more kinds thereof.

<Other Additives>

The first ink composition may contain components other than the components described above.

Examples of other components include known additives such as a fading inhibitor, an emulsion stabilizer, a penetration enhancer, an ultraviolet absorbing agent, a preservative, an antibacterial agent, a pH adjuster, a surface tension adjuster, an antifoaming agent, a viscosity adjuster, a dispersion stabilizer, a rust inhibitor, and a chelating agent.

<Physical Properties of First Ink Composition>

From the viewpoint of the suitability of members for a recording device, the pH of the first ink composition according to the embodiment of the present disclosure is preferably in a range of 4 to 10, more preferably in a range of 5 to 9, and still more preferably in a range of 5.5 to 8.5.

In the present disclosure, the pH can be measured using a pH meter (Toa DKK pH meter HM-20J, manufactured by Tokyo Garasu Kikai Co., Ltd.) in a temperature environment of 25° C., unless otherwise specified.

The viscosity of the first ink composition according to the embodiment of the present disclosure is preferably in a range of 1 mPa·s to 30 mPa·s and more preferably in a range of 1.5 mPa·s to 20 mPa·s.

In the present disclosure, the viscosity is measured under conditions of a measurement temperature of 23° C. and a shear rate of $1,400 \text{ s}^{-1}$ using a TV-20 type viscometer (manufactured by Toki Sangyo Co., Ltd.) as a measuring device, unless otherwise specified.

The surface tension of the first ink composition according to the embodiment of the present disclosure is preferably in a range of 20 mN/m to 60 mN/m, more preferably in a range of 20 mN/m to 45 mN/m, and still more preferably in a range of 25 mN/m to 40 mN/m.

In the present disclosure, the surface tension thereof is measured under a temperature condition of 25° C. using an Automatic Surface Tensiometer CBVP-Z (manufactured by Kyowa Interface Science Co., Ltd.) according to a plate method, unless otherwise specified.

<Second Ink Composition>

The second ink composition according to the embodiment of the present disclosure contains water, a colorant, and a resin containing an unneutralized acid group.

Since the second ink composition according to the embodiment of the present disclosure contains a resin containing an unneutralized acid group, the ampholyte that may be present as a cation in the first ink composition easily reacts with the resin in a case where the second ink composition comes into contact with the first ink composition, and the dispersed components such as the colorant contained in the second ink composition can be satisfactorily aggregated.

Further, the unneutralized acid group indicates an acid group that is not neutralized and indicates, for example, "—COOH" in a case where the acid group is a carboxyl group (—COOH).

It is preferable that the second ink composition does not contain an ampholyte. Here, the expression "the second ink composition does not contain an ampholyte" means that the content of the ampholyte is in a range of 0% by mass to 0.0001% by mass with respect to the total mass of the second ink composition. The content of the ampholyte is preferably 0% by mass.

(Resin Containing Unneutralized Acid Group)

The second ink composition according to the embodiment of the present disclosure contains a resin containing an unneutralized acid group. It is preferable that the resin is a dispersant containing an unneutralized acid group (hereinafter, the dispersant contained in the second ink composition is also referred to as a second dispersant in the present specification).

As the resin containing an unneutralized acid group, only one dispersant may be used or two or more kinds of dispersants may be used in combination.

Examples of the unneutralized acid group include —COOH, —SO$_3$H, and —H$_2$PO$_4$.

The content of resin containing an unneutralized acid group, which is contained in the second ink composition, is preferably in a range of 0.1% by mass to 6% by mass, more preferably in a range of 0.2% by mass to 5% by mass, and still more preferably in a range of 0.3% by mass to 4% by mass with respect to the total mass of the second ink composition.

—Acid Value—

It is preferable that the acid value of the resin containing an unneutralized acid group is larger than the acid value of the first dispersant.

In this manner, the resin containing an unneutralized acid group is more likely to react with the ampholyte and thus the aggregating property of the dispersed components in the second ink composition can be further improved, as compared with the dispersant contained in the first ink composition.

At least one resin containing an unneutralized acid group has an acid value of preferably 20 mgKOH/g or greater. In this manner, the aggregating property of the dispersed components in the second ink composition can be further improved.

From the same viewpoint as described above, at least one resin containing an unneutralized acid group has an acid value of more preferably 50 mgKOH/g or greater, still more preferably 60 mgKOH/g or greater, and particularly preferably 75 mgKOH/g or greater.

Further, from the same viewpoint as described above, at least one resin containing an unneutralized acid group has an acid value of preferably 200 mgKOH/g or less, more preferably 180 mgKOH/g or less, and still more preferably 150 mgKOH/g or less.

For example, at least one resin containing an unneutralized acid group has an acid value of preferably 50 mgKOH/g to 200 mgKOH/g.

Further, the acid value of the resin containing an unneutralized acid group can be measured by the method described above.

The preferable ranges of the weight-average molecular weight of the resin containing an unneutralized acid group are the same as those of the first dispersant described above.

Further, the weight-average molecular weight of the resin containing an unneutralized acid group can be measured by the method described above.

As the resin containing an unneutralized acid group, those exemplified as the first dispersant described above can be used. However, the second dispersant in the present disclosure is not limited thereto.

(Colorant)

The colorant contained in the second ink composition will be described in detail.

As the colorant, known dyes, pigments, and the like can be used without particular limitation. Among these, from the viewpoint of the ink colorability, a colorant that is almost insoluble or hardly soluble in water is preferable. Specific examples thereof include various pigments, dispersed dyes, oil-soluble dyes, and coloring agents that form J-aggregates. Further, pigments are more preferable from the viewpoint of the light fastness.

The pigment is not particularly limited and can be appropriately selected depending on the purpose. For example, any of an organic pigment or an inorganic pigment may be used as the pigment.

Examples of the organic pigment include an azo pigment, a polycyclic pigment, a chelate dye, a nitro pigment, a nitroso pigment, and aniline black. Among these, an azo pigment and a polycyclic pigment are more preferable. Examples of the azo pigment include azo lake, an insoluble azo pigment, a condensed azo pigment, and a chelated azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the chelate dye include a basic dye-type chelate and an acid dye-type chelate.

Examples of the inorganic pigment include titanium oxide, iron oxide, calcium carbonate, barium sulfate, aluminum hydroxide, yellow barium, cadmium red, chrome yellow, and carbon black. Among these, carbon black is particularly preferable. Examples of the carbon black include those produced by known methods such as a contact method, a furnace method, and a thermal method.

Specific examples of the carbon black include Raven 7000, Raven 5750, Raven 5250, Raven 5000 ULTRAII, Raven 3500, Raven 2000, Raven 1500, Raven 1250, Raven 1200, Raven 1190 ULTRAll, Raven 1170, Raven 1255, Raven 1080, Raven 1060, and Raven 700 (all manufactured by Colombian Carbon Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (manufactured by Cabot Corporation), Color black FW1, Color Black FW2, Color Black FW2V, Color Black 18, Color Black FW200, Color Black S150, Color Black S160, Color Black S170, Printex35, Printex U, Printex V, Printex140U, Printex140V, Special Black 6, Special Black 5, Special Black 4A, and Special Black 4 (manufactured by Orion Engineered Carbons Co., Ltd.), No. 25, No. 33, No. 40, No. 45, No. 47, No. 52, No. 900, No. 2200B, No. 2300, MCF-88, MA600, MA7, MA8, and MA100 (all manufactured by Mitsubishi Chemical Corporation), and COLOUR BLACK FW182 (manufactured by Orion Engineered Carbons Co., Ltd.), but the present disclosure is not limited thereto.

Examples of the organic pigment that can be used in the present disclosure include pigments of yellow ink, such as C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, and 180. Among these, a pigment having an azo skeleton is preferable, and C. I. Pigment Yellow 74 is the most preferable particularly from the viewpoints of the availability and the cost.

Further, examples thereof include pigments of magenta ink, such as C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (red iron oxide), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269; and C. I. Pigment Violet 19. Among these, a pigment having a quinacridone skeleton is preferable, and C. I. Pigment Red 122 is most preferable.

Further, examples thereof include pigments of cyan ink, such as C. I. Pigment Blue 1, 2, 3, 15, 15:1, 15:2, 15:3, 15:34, 16, 17:1, 22, 25, 56, 60; C. I. Vat Blue 4, 60, and 63. Among these, C. I. Pigment Blue 15:3 is particularly preferable.

The above-described pigments may be used alone or a plurality of pigments selected from each group or between each group may be used in combination.

It is preferable that the second ink composition contains a colorant different from the colorant contained in the first ink composition.

It is preferable that the second ink composition is at least one of a colored ink, a black ink, or a metallic ink.

From the viewpoints of the ink colorability and the storage stability, the content of the colorant in the second ink composition is preferably in a range of 0.1% to 20% by mass, more preferably in a range of 0.2% to 15% by mass, and particularly preferably in a range of 0.5% to 10% by mass with respect to the total mass of the solid content of the second ink composition.

The second ink composition may contain resins other than the resin containing an unneutralized acid group (in the present specification, also simply referred to as other resins).

As other resins contained in the second ink composition, the resins exemplified as the resin contained in the first ink composition described above can be used, and the preferred embodiments are the same as described above.

(Water)

The second ink composition may contain water.

As water, for example, ion exchange water, distilled water, or the like can be used.

The content of water is preferably in a range of 50% by mass to 90% by mass and more preferably in a range of 60% by mass to 80% by mass with respect to the total mass of the second ink composition.

<Other Additives>

The second ink composition may contain components other than the components described above.

Examples of other components include known additives such as a fading inhibitor, an emulsion stabilizer, a penetration enhancer, an ultraviolet absorbing agent, a preservative, an antibacterial agent, a pH adjuster, a surface tension adjuster, an antifoaming agent, a viscosity adjuster, a dispersion stabilizer, a rust inhibitor, and a chelating agent.

<Physical Properties of Second Ink Composition>

From the viewpoint of the aggregating property of the second ink composition, the pH of the second ink composition according to the embodiment of the present disclosure is preferably in a range of 6 to 12, more preferably in a range of 7 to 11, and still more preferably in a range of 8 to 10.

Further, the pH of the second ink composition according to the embodiment of the present disclosure can be measured by the same method as in the case of the first ink composition described above.

In the ink set according to the embodiment of the present disclosure, the difference obtained by subtracting the pH of the first ink composition from the pH of the second ink composition is preferably in a range of 0.4 to 2.0.

In a case where the difference obtained by subtracting the pH of the first ink composition from the pH of the second ink composition is 0.4 or greater, the aggregating property can be further improved.

In a case where the difference obtained by subtracting the pH of the first ink composition from the pH of the second ink composition is 2.0 or less, the adhesiveness between a layer formed of the first ink composition and a layer formed of the second ink composition can be improved.

The viscosity of the second ink composition according to the embodiment of the present disclosure is preferably in a range of 1 mPa·s to 30 mPa·s and more preferably in a range of 1.5 mPa·s to 20 mPa·s.

The surface tension of the second ink composition according to the embodiment of the present disclosure is preferably in a range of 20 mN/m to 60 mN/m, more preferably in a range of 20 mN/m to 45 mN/m, and still more preferably in a range of 25 mN/m to 40 mN/m.

<<Image Recording Method>>

An image recording method according to the embodiment of the present disclosure is an image recording method that is performed using the ink set described above. The image recording method according to the embodiment of the present disclosure includes a first ink applying step of applying the first ink composition in the ink set described above onto the base material, and a second ink applying step of applying the second ink composition in the ink set described above onto the base material.

In the image recording method according to the embodiment of the present disclosure, the second ink applying step may be performed after the first ink applying step is performed, the first ink applying step may be performed after the second ink applying step is performed, or the first ink applying step and the second ink applying step may be simultaneously performed by an ink jet method. Among these, in the image recording method according to the embodiment of the present disclosure, it is preferable that the second ink applying step described below is performed after the first ink applying step is performed.

That is, the image recording method according to the embodiment of the present disclosure includes the step of applying the first ink composition containing an ampholyte onto the surface of the base material before the step of applying the second ink composition onto the surface of the base material, and it is preferable that the step of applying the second ink composition onto the surface of the base material is a step of applying the second ink composition to at least a part of a region on the surface of the base material, to which the first ink composition has been applied, using the ink jet method.

Hereinafter, an example of the image recording method according to the embodiment of the present disclosure will be described.

In the image recording method according to the embodiment of the present disclosure, it is preferable that at least one of the first ink applying step or the second ink applying step is performed by applying the first ink composition or the second ink composition according to the ink jet method.

Further, the image recording method according to the embodiment of the present disclosure may include other steps as necessary.

Hereinafter, each step in an example of the image recording method according to the embodiment of the present disclosure will be described.

<First Ink Applying Step>

The first ink applying step in the present disclosure is a step of applying the first ink composition in the ink set according to the embodiment of the present disclosure onto the base material.

The application of the first ink composition is not particularly limited as long as the first ink composition is applied onto the surface of the base material. For example, the first ink composition may be applied onto the surface of the base material so as to come into contact with the base material or may be applied so as to come into contact with at least a part of the region on the surface of the base material to which the second ink composition described below has been applied.

The application of the first ink composition onto the base material can be performed by applying a known method such as a coating method, an ink jet method, or an immersion method.

Examples of the coating method include known coating methods using a bar coater (such as a wire bar coater), an extrusion die coater, an air doctor coater, a blade coater, a rod coater, a knife coater, a squeeze coater, a reserve roll coater, a gravure coater, or a flexo coater.

As a method of applying the ink composition in the first ink applying step, a known ink jet method can be applied.

The method of allowing the first ink composition to be jetted in the ink jet method is not particularly limited, and any of known methods such as an electric charge control method of allowing an ink composition to be jetted using an electrostatic attraction force; a drop-on-demand method (pressure pulse method) using a vibration pressure of a piezoelectric element; an acoustic ink jet method of allowing the first ink composition to be jetted using a radiation pressure by converting an electric signal into an acoustic beam and irradiating the first ink composition with the acoustic beam; and a thermal ink jet (bubble jet (registered trademark)) method of heating an ink composition to form bubbles and utilizing the generated pressure may be used.

As the ink jet method, particularly, an ink jet method described in JP1979-059936A (JP-S54-059936A) in which the first ink composition is jetted from a nozzle using an action force caused by a rapid change in volume of the ink composition after being subjected to an action of thermal energy can be effectively used.

Further, the method described in paragraphs 0093 to 0105 of JP2003-306623A can also be applied as the ink jet method.

The application of the first ink composition according to the ink jet method is performed by allowing the first ink composition to be jetted from a nozzle of an ink jet head.

Examples of the system of the ink jet head include a shuttle system of performing recording while scanning a short serial head in the width direction of the base material and a line system of using a line head in which recording elements are aligned in correspondence with the entire area of one side of the base material.

In the line system, image recording can be performed on the entire surface of the base material by scanning the base material in a direction intersecting the direction in which the recording elements are aligned. In the line system, a transport system such as a carriage that scans a short head in the shuttle system is not necessary. Further, in the line system, since the movement of a carriage and complicated scanning control between the head and the base material are not necessary as compared with the shuttle system, only the base material moves. Therefore, according to the line system, image recording at a higher speed than that of the shuttle system can be realized.

From the viewpoint of obtaining a high-definition image, the liquid droplet amount of the first ink composition jetted from the nozzle of the ink jet head is preferably in a range of 1 pL (pico liter) to 10 pL and more preferably in a range of 1.5 pL to 6 pL.

In addition, from the viewpoints of improving the image irregularity and improving connection of continuous gradations, it is also effective that the ink is jetted by combining different amounts of liquid droplets.

Further, the ink jet head may comprise a liquid-repellent film on the surface to which the first ink composition is jetted (first ink jetted surface). Examples of the liquid-repellent film include those described in paragraphs 0178 to 0184 of JP2016-193980A.

The mass ($g/m^2$) of the first ink composition to be applied per unit area is not particularly limited as long as the components in the ink composition can be aggregated, but is preferably in a range of 0.1 $g/m^2$ to 10 $g/m^2$, more preferably in a range of 0.5 $g/m^2$ to 6.0 $g/m^2$, and still more preferably in a range of 1.0 $g/m^2$ to 4.0 $g/m^2$.

Further, the amount of the ampholyte to be applied to the base material is preferably in a range of 0.3 $mmol/m^2$ to 2.2 $mmol/m^2$, more preferably in a range of 0.5 $mmol/m^2$ to 2.0 $mmol/m^2$, and still more preferably in a range of 0.8 $mmol/m^2$ to 1.8 $mmol/m^2$.

Further, in the first ink composition applying step, the base material may be heated before the application of the first ink composition.

The heating temperature may be appropriately set according to the kind of the base material or the composition of the first ink composition, but the temperature of the base material is set to be preferably in a range of 20° C. to 50° C. and more preferably in a range of 25° C. to 40° C.

The image recording method may include a drying step of heating and drying the first ink composition applied after the first ink applying step and before the second ink applying step described below.

Examples of the means for heating and drying the first ink composition include known heating means such as a heater, known air blowing means such as a dryer, and means for combining these.

Examples of the method for heating and drying the first ink composition include a method of applying heat using a heater or the like from a side of the base material opposite to the surface to which the first ink composition has been applied; a method of applying warm air or hot air to the surface of the base material to which the first ink composition has been applied; a method of applying heat using an infrared heater from the surface of the base material to which the first ink composition has been applied or from a side of the base material opposite to the surface to which the first ink composition has been applied; and a method of combining a plurality of these methods.

The heating temperature of heating and drying the treatment liquid is preferably 35° C. or higher and more preferably 40° C. or higher.

The upper limit of the heating temperature is not particularly limited, and the upper limit thereof is preferably 100° C., more preferably 90° C., and still more preferably 70° C.

The time of heating and drying the treatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

<Second Ink Applying Step>

The second ink applying step is a step of applying the second ink composition in the ink set according to the embodiment of the present disclosure onto the base material.

The second ink composition may be applied onto the surface of the base material so as to come into contact with the base material, may be applied to come into contact with at least a part of a region on the surface of the base material, to which the first ink composition described above has been applied, or may be applied to come into contact with at least a part of a region, to which another ink composition recorded on the surface of the base material has been applied, and the region to which the ink composition is applied is not particularly limited as long as the region is on the surface of the base material.

The ink composition can be selectively applied onto the surface of the base material by performing the above-described step. In this manner, a desired image (specifically, a visible image) can be recorded.

The second ink applying step that is performed by the ink jet method is the same as the step of applying the first ink composition onto the surface of the base material except that the application of the second ink composition is performed on the surface of the base material, and the preferred embodiments thereof are the same as described above.

The second ink composition can be selectively applied onto the surface of the base material by performing the above-described step. In this manner, a desired image (specifically, a visible image) can be recorded.

In the second ink applying step, only one kind of the second ink composition according to the embodiment of the present disclosure or two or more kinds of the second ink compositions according to the embodiment of the present disclosure may be applied.

As the method of applying the ink composition in the second ink applying step, a known ink jet method can be applied.

The details of the ink jet method are the same as the details of the ink jet method which can be applied to the first ink applying step described above.

In the second ink applying step, the applied second ink composition may be heated and dried.

Examples of the means for heating and drying the ink composition include known heating means such as a heater, known air blowing means such as a dryer, and means for combining these.

Examples of the method for heating and drying the second ink composition include a method of applying heat using a heater or the like from a side of the base material opposite to the surface to which the second ink composition has been applied; a method of applying warm air or hot air to the surface of the base material to which the second ink composition has been applied; a method of applying heat using an infrared heater from the surface of the base material to which the second ink composition has been applied or from a side of the base material opposite to the surface to which the second ink composition has been applied; and a method of combining a plurality of these methods.

The heating temperature of heating and drying the ink composition is preferably 55° C. or higher, more preferably 60° C. or higher, and particularly preferably 65° C. or higher.

The upper limit of the heating temperature is not particularly limited, and the upper limit thereof is preferably 100° C. and more preferably 90° C.

The time of heating and drying the second ink composition is not particularly limited, but is preferably in a range of 3 seconds to 60 seconds, more preferably in a range of 5 seconds to 60 seconds, and particularly preferably in a range of 10 seconds to 45 seconds.

Further, in the second ink applying step, the base material (or the base material to which the second ink composition has been applied in the second ink applying step described below) may be heated before the application of the second ink composition.

The heating temperature may be appropriately set according to the kind of the base material, the composition of the second ink composition, and the like, but the temperature of the base material is set to be preferably in a range of 20° C. to 50° C. and more preferably in a range of 25° C. to 40° C.

Further, in the second ink applying step described below, in a case where the second ink composition is heated and dried, the heating for heating and drying the second ink composition may also serve as the heating of the base material before the application of the second ink composition.

[Base Material]

The base material used in the image recording method according to the embodiment of the present disclosure is not particularly limited, and examples thereof include paper, coated paper, a resin base material, a metal, a ceramic, glass, and a textile base material.

In the image recording method according to the present disclosure, it is also preferable to use an impermeable base material because an image with excellent concealability can be obtained.

In the present disclosure, the "impermeable base material" indicates a base material that absorbs less water or does not absorb water. Specifically, the "impermeable base material" indicates a base material having a water absorption amount of 0.3 g/m² or less.

The water absorption amount (g/m²) of the base material is measured as follows.

Water is brought into contact with a region having a size of 100 mm×100 mm in the front surface of the base material (that is, the surface to which an image is recorded), and the state is maintained at 25° C. for 1 minute. The mass (absorption amount (g)) of water absorbed by maintaining the state for 1 minute is acquired, and the obtained absorption amount (g) is converted to the absorption amount per unit area (g/m²).

The impermeable base material is not particularly limited, but a resin base material is preferable.

The resin base material is not particularly limited, and examples thereof include a base material formed of a thermoplastic resin.

A base material obtained by molding a thermoplastic resin in the form of a sheet is exemplified as the resin base material.

It is preferable that the resin base material contains polypropylene, polyethylene terephthalate, nylon, polyethylene, or polyimide.

The resin base material may be a transparent resin base material or a colored resin base material, and at least a part thereof may be subjected to a metal vapor deposition treatment or the like.

In the present disclosure, the term "transparent" indicates that the minimum transmittance at a wavelength of 400 nm to 700 nm at 23° C. is 80% or greater (preferably 90% or greater and more preferably 95% or greater). The minimum transmittance is measured in every 1 nm using a spectrophotometer (for example, spectrophotometer UV-2100, manufactured by Shimadzu Corporation).

The shape of the resin base material is not particularly limited, but a sheet-shaped resin base material is preferable. From the viewpoint of the productivity of the image recorded material, a sheet-shaped resin base material which is capable of forming a roll by being wound is more preferable.

The thickness of the resin base material is preferably in a range of 10 μm to 200 μm and more preferably in a range of 10 μm to 100 μm.

<<Ink Composition>>

The ink composition according to the embodiment of the present disclosure contains water, a white pigment, a dispersant having an acid value of 50 mgKOH/g or less, and an ampholyte.

As the water, the white pigment, the dispersant having an acid value of 50 mgKOH/g or less, and the ampholyte contained in the ink composition according to the embodiment of the present disclosure, those contained in the first ink composition in the ink set described above can be used, and the preferred embodiments thereof are the same as described above.

EXAMPLES

Hereinafter, the present invention will be described in more detail based on examples, but the present invention is not limited to the following examples unless the gist thereof is overstepped. Further, "parts" are on a mass basis unless otherwise specified.

In the present example, the pH, the acid value, the amine value, the volume average particle diameter, the average primary particle diameter, and the weight-average molecular weight of the resin particles were measured by the methods described above.

Examples 1 to 27 and Comparative Example 1

[First Ink Composition (Ink 1-1 to Ink 1-23)]
<Preparation of Pigment Dispersion of First Ink Composition>

150 parts of each dispersant (first dispersant) listed in Table 1 was dissolved in water to prepare an aqueous solution of each dispersant using a potassium hydroxide aqueous solution such that the pH after neutralization was set to 9 and the concentration of the dispersant was set to approximately 25% by mass.

Further, each component was mixed according to the composition of the following pigment dispersion, thereby obtaining each mixed solution.

Next, each of the mixed solutions was subjected to a dispersion treatment for 1.5 hours using LABOSTAR Mini LMZ015 (manufactured by Ashizawa Finetech Ltd., bead diameter: 0.1 mmφ, zirconia beads, rotation speed: 10 m/sec), thereby obtaining each pigment dispersion (solid content of pigment: 50% by mass).

[Composition of Pigment Dispersion]

Aqueous solution of dispersant listed in Table 1: the amount corresponding to the content of the dispersant listed in Table 1

Pigment listed in Table 1: 500 parts by mass

Propylene glycol: 100 parts by mass

Water: the remainder set such that the total amount of the composition reaches 1000 parts by mass <Preparation of First Ink Composition (Ink 1-1 to Ink 1-23)>

In each of examples or comparative examples, the respective components were mixed so as to have the composition shown below, and each solution obtained by stirring the mixture at room temperature (25° C.) for 1 hour was used as the first ink composition (ink 1-1 to ink 1-23).

The numerical values of the contents listed in Table 1 and parts by mass in the following composition indicate % by mass of the solid content of each compound in a case where the total mass of the ink composition is set to 100% by mass. Here, the content of the dispersant shows % by mass of the solid content in a case where the total mass of the pigment is set to 100% by mass.

[Composition]

Each pigment dispersion: the amount corresponding to the content of the pigment listed in Table 1 and the content of the dispersant listed in Table 1

Ampholytes listed in Table 1: the amount listed in Table 1

Metal oxide particles listed in Table 1: the amount listed in Table 1

Diethylene glycol: 9 parts by mass

Propylene glycol (PG): 26 parts by mass

Resin A (resin particles, acrylic latex, solid content of 23% by mass): the amount listed in Table 1

OLFINE Exp. 4200 (manufactured by Nissin Chemical Industry Co., Ltd., surfactant): 1 part by mass Ion exchange water: the amount set such that the total amount of the composition reaches 100 parts by mass <Synthesis Method of Resin A>

A 2 L three-neck flask provided with a mechanical stirrer, a thermometer, a reflux cooling pipe, and a nitrogen gas introduction pipe was charged with methyl ethyl ketone (540.0 g), and the methyl ethyl ketone was heated to 75° C. A mixed solution formed of methyl methacrylate (378.0 g), isobornyl methacrylate (108 g), methacrylic acid (54.0 g), methyl ethyl ketone (108 g), and "V-601" (manufactured by FUJIFILM Wako Pure Chemical Corporation) (2.1 g) was added dropwise to the methyl ethyl ketone at a constant speed such that the dropwise addition was completed in 2 hours while the temperature in the reaction container was maintained at 75° C. After the completion of the dropwise addition, a solution formed of "V-601" (1.15 g) and methyl ethyl ketone (15.0 g) was added thereto, and the resulting solution was stirred at 75° C. for 2 hours. Further, a solution formed of "V-601" (0.54 g) and methyl ethyl ketone (15.0 g) was added thereto, and the resulting solution was stirred at 75° C. for 2 hours. Thereafter, the solution was heated to 85° C. and continuously stirred temperature for 2 hours, thereby obtaining a resin solution of a copolymer of methyl methacrylate, isobornyl methacrylate, and methacrylic acid (=70/20/10).

The weight-average molecular weight (Mw) of the obtained copolymer was 60000, the acid value thereof was 54.2 mgKOH/g, and the glass transition temperature thereof was 124° C.

Next, the resin solution (588.2 g) was weighed, isopropanol (165 g) and a 1 mol/L sodium hydroxide aqueous solution (120.8 ml) were added thereto, and the temperature in the reaction container was increased to 80° C. Next, distilled water (718 g) was added dropwise thereto at a speed of 20 ml/min, to carry out dispersion in water. Next, the temperature in the reaction container was maintained at 80° C. for 2 hours, 85° C. for 2 hours, and 90° C. for 2 hours under the atmospheric pressure, and the solvent was distilled off. Further, the pressure inside the reaction container was reduced, and isopropanol, methyl ethyl ketone, and distilled water were distilled off, thereby obtaining a resin A (an aqueous dispersion having a solid content of 25.0% by mass).

[Second Ink Composition (Ink 2-1 to Ink 2-4)]

<Preparation of Pigment Dispersion of Second Ink Composition>

150 parts of each second dispersant (resin containing an unneutralized acid group) listed in Table 2 was dissolved in water to prepare an aqueous solution of each dispersant using a potassium hydroxide aqueous solution such that the pH after neutralization was set to 9 and the concentration of the dispersant was set to approximately 25% by mass.

Further, each component was mixed according to the composition shown below, thereby obtaining each mixed solution.

Next, each of the mixed solutions was subjected to a dispersion treatment for 1.5 hours using LABOSTAR Mini LMZ015 (manufactured by Ashizawa Finetech Ltd., bead diameter: 0.3 mmφ, zirconia beads, rotation speed: 13 m/sec), thereby obtaining each pigment dispersion (solid content of pigment: 20% by mass).

[Composition of Pigment Dispersion]

Aqueous solution of second dispersant listed in Table 2: the amount corresponding to the content of the second dispersant listed in Table 2

PB15:3 (pigment): 200 parts by mass

Propylene glycol: 100 parts by mass

Water: the remainder set such that the total amount of the composition reaches 1000 parts by mass <Preparation of Second Ink Composition (Ink 2-1 to Ink 2-4)>

In each of the examples or comparative examples, the respective components were mixed so as to have the composition shown below, thereby preparing each second ink composition (ink 2-1 to ink 2-4) using the same method as that for the first ink composition.

The numerical values of the contents listed in Table 2 and parts by mass in the following composition indicate % by mass of the solid content of each compound in a case where the total mass of the ink composition is set to 100% by mass. Here, the content of the second dispersant shows % by mass of the solid content in a case where the total mass of the pigment is set to 100% by mass.

[Composition]

Each pigment dispersion: 14 parts by mass

Diethylene glycol: 9 parts by mass

Propylene glycol (PG): 26 parts by mass

OLFINE Exp. 4200 (manufactured by Nissin Chemical Industry Co., Ltd., surfactant): 1 part by mass Resin A (resin particles, acrylic latex, solid content of 23% by mass): 4.0 parts by mass Ion exchange water: the amount set such that the total amount of the composition reaches 100 parts by mass <Evaluation Method>

(Aggregating Property)

The images of the characters shown in FIG. 1 were recorded by the following method, and the aggregating property was evaluated.

First, a GELJET (registered trademark) GX5000 printer head (manufactured by Ricoh Co., Ltd.) was prepared. The printer head is a line head in which 96 nozzles are arranged.

The printer head was fixed by being aligned in a direction (main scanning direction) of the line head in which the nozzles were arranged in a direction orthogonal to a moving direction (sub scanning direction) of a stage that was able to move in a predetermined linear direction at 500 mm/sec.

As a recording medium, a polyethylene terephthalate (PET) base material (FE2001, manufactured by Futamura Chemical Co., Ltd., thickness of 12 μm) was prepared and attached to the stage.

Further, the images of the characters (unicode: U+9DF9) shown in FIG. 1 were respectively recorded at 5 pt, 6 pt, and 7 pt as colorless and outline characters, according to the following procedures.

In Examples 1 to 14, Example 16, Examples 18 to 27, and Comparative Example 1, the first ink applying step, the drying step between the ink applying steps, the second ink applying step, and the drying step were performed in this order. Further, the application of the second ink composition in the second ink applying step was performed in 2 seconds after the drying step between the ink applying steps.

Example 15 was the same as Examples 1 to 14, Example 16, Examples 18 to 27, and Comparative Example 1 except that the drying step between the ink applying steps was not performed.

In Example 17, the second ink applying step, the drying step between the ink applying steps, the first ink applying step, and the drying step were performed in this order. Further, the application of the first ink composition in the first ink applying step was performed in 2 seconds after the drying step between the ink applying steps.

Further, in a case where the second ink applying step was performed after the first ink applying step, the second ink composition was applied to the surface of the base material onto which the first ink composition had been applied. Further, in a case where the first ink applying step was performed after the second ink applying step, the first ink composition was applied to the surface of the base material onto which the second ink composition had been applied.

Hereinafter, each step will be described.

[First Ink Applying Step]

First, the PET base material was fixed onto the stage of the ink jet recording device, and the recording medium was coated with the first ink composition such that the coating amount thereof was set to approximately 1.5 g/m² using a wire bar coater while the stage onto which the recording medium had been fixed was allowed to move in a linear direction at a constant speed of 339 mm/sec.

[Drying Step Between Ink Applying Steps]

In a case where the second ink applying step was performed after the first ink applying step was performed, the drying of the first ink composition was started under a temperature condition of 50° C. using a dryer after 1.5 seconds from the completion of the application of the first ink composition to the site where the application of the first ink composition was completed, and the drying was completed after 11.5 seconds from the completion of the application of the first ink composition. The drying time here was 10 seconds.

Further, in a case where the first ink applying step was performed after the second ink applying step was performed, the drying step was performed in the same manner as in the drying step between the ink applying steps in the case where the second ink applying step was performed after the first ink applying step was performed except that the first ink composition was used as the second ink composition and the second ink composition was used as the first ink composition.

[Second Ink Applying Step]

The second ink composition was allowed to be jetted from the ink jet nozzle of the printer head according to the line system while the base material was allowed to move at a constant stage speed of 339 mm/min, and the characters (unicode: U+9DF9) shown in FIG. 1 were respectively output at 5 pt, 6 pt, and 7 pt as colorless and outline characters.

The ink composition was jetted under conditions of an ink droplet amount of 4.0 pL, a jetting frequency of 10 kHz, and a resolution (nozzle arrangement direction×transport direction) of 75 dpi×600 dpi (dot per inch).

Further, an ink composition which was degassed through a degassing filter and in which the temperature thereof was adjusted to 30° C. was used as the second ink composition.

The outline character in the present disclosure indicates a character recorded in white without coloring a part of a region filled with a specific color. Further, the colorless character in the present disclosure indicates a character recorded in a color other than white and a first color without adding the first color to a part of a region filled with the first color.

[Drying Step]

The jetted ink composition immediately after image recording was dried at 70° C. for 10 seconds using a dryer.

(Aggregating Property)

The images of the characters shown in FIG. 1 which had been recorded as described above were evaluated based on the following evaluation standards. The results are shown in Table 3.

—Evaluation Standards—

A+: The colorless and outline characters with a size of 5 pt to 7 pt were able to be clearly read.

A: The colorless and outline characters with a size of 6 pt to 7 pt were able to be clearly read, and the colorless and outline character with a size of 5 pt was able to be read even though bleeding was found.

B: The colorless and outline character with a size of 5 pt to 7 pt were able to be read even though bleeding was found.

C: The colorless characters with a size of 5 pt to 7 pt and the outline character with a size of 5 pt were able to be read even though bleeding was found, and the colorless characters with a size of 6 pt to 7 pt were able to be clearly read.

D: All the characters in FIG. 1 were able to be read even though bleeding was slightly found.

E: Bleeding was found in all the characters in FIG. 1 and the characters were not able to be read.

Figure 2:
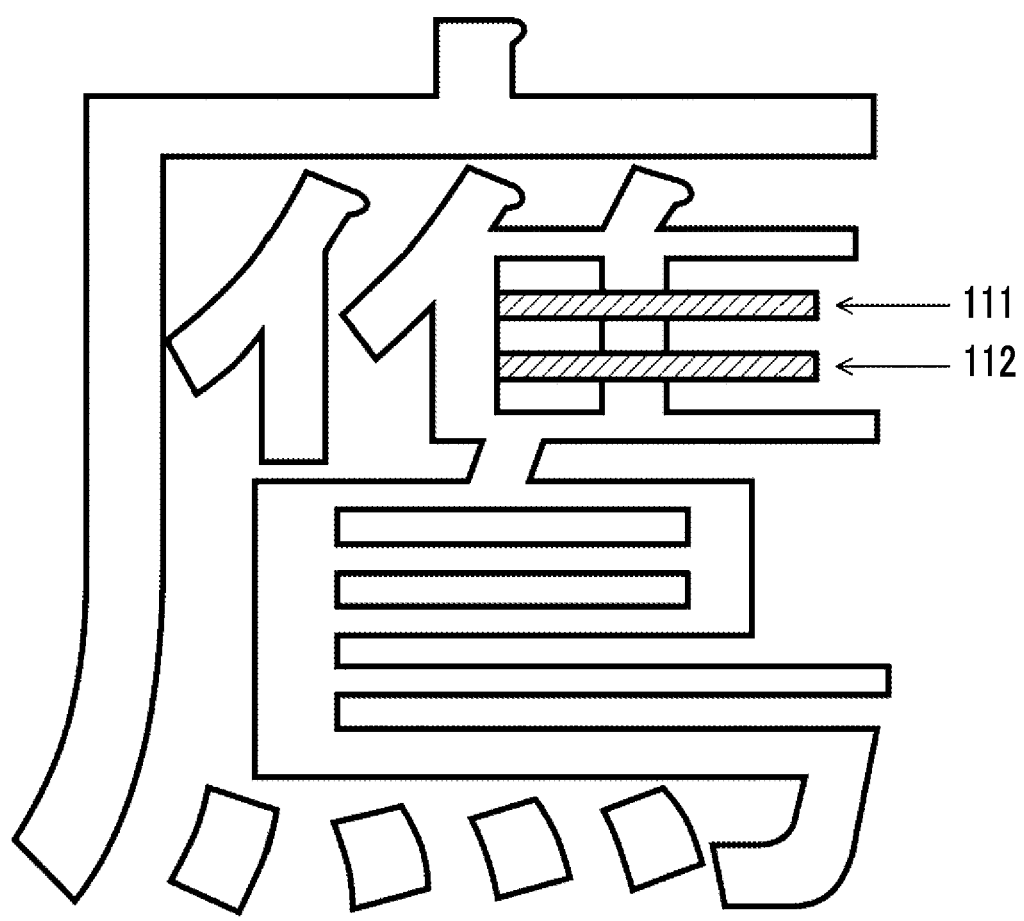
FIG. 2 is a view for explaining the details of evaluation standards for the aggregating property in the examples.

Further, the expression of "were able to be read" means that separate recording of the horizontal line indicated by the reference numeral 111 in FIG. 2 and the horizontal lines indicated by the reference numeral 112 in FIG. 2 in the characters shown in FIG. 1 can be confirmed as viewed from a distance of 0.5 m.

(Storage Stability)

The storage stability was evaluated using the first ink composition prepared in the examples and comparative Examples.

In regard to the thickening of the first ink composition, the viscosity thereof was measured before and after the first ink composition was allowed to stand in a sealed state at 50° C. for 336 hours, and the rate of change in viscosity before and after the standing was calculated.

The storage stability was evaluated using the calculated rate in change based on the following evaluation standards. The results are shown in Table 3.

Further, the viscosity was measured at 30° C. using a TV-20 type viscometer (manufactured by Toki Sangyo Co., Ltd.).

—Evaluation Standards—

A+: The rate of change in viscosity was less than 1%.

A: The rate of change in viscosity was 1% or greater and less than 2%.

B: The rate of change in viscosity was 2% or greater and less than 6%.

C: The rate of change in viscosity was 6% or greater and less than 15%.

D: The rate of change in viscosity was 15% or greater and less than 25%.

(Adhesiveness)

A recorded material was prepared according to the same method as the method in the evaluation of the aggregating property except that the image recorded was changed to a solid image having a size of 30 mm×30 mm.

A cross hatch test was performed in conformity with ISO2409 (cross-cut method) on the recorded material which had been prepared in the above-described manner, and the evaluation was performed according to the following evaluation standards. In the cross hatch test, the cut interval was set to 1 mm, and 25 square grids having a size of 1 mm square were formed. The results are shown in Table 3.

In the following evaluation standards, the percentage (%) of grid peeling is a value acquired by the following equation. The total number of grids in the following equation is 25.

Percentage (%) of grid peeling=[(number of grids which were peeled off)/(total number of grids)]×100

<Evaluation Standards>

A: The percentage (%) of grid peeling was 0%.

B: The percentage (%) of grid peeling was greater than 0% and less than 5%.

C: The percentage (%) of grid peeling was 5% or greater and less than 50%.

D: The percentage (%) of grid peeling was 50% or greater and less than 80%.

(Water Resistance and Alcohol Resistance)

A solid image was prepared as a recorded material according to the same method as the method in the evaluation of the jettability.

Further, color fading was evaluated as water resistance by rubbing the image surface of the recorded material 10 times using a cotton swab to which ultrapure water was applied, based on the following evaluation standards.

Further, alcohol resistance was evaluated according to the same method as the method described above except that ultrapure water was changed to ethanol (20 mass % diluent), based on the following evaluation standards. The results are shown in Table 3.

—Evaluation Standards—

A: The image was not color-faded at all.

B: A part of the image was slightly color-faded.

C: A part of the image was more color-faded as compared with B evaluation, but the base material was not visible.

D: A part of the image was color-faded, and the base material was partially visible.

TABLE 1

| | First ink composition | | | | | | |
|---|---|---|---|---|---|---|---|
| | | Pigment | | Dispersant | | | |
| Ink No. | Type | Particle diameter (nm) | Content (% by mass) | Type | Acid value [mg KOH/g] | Amine value [mg KOH/g] | Content (% by mass) | Ampholyte Type |
| Ink 1-1 | TiO$_2$ | 234 | 14 | P-2 | 14 | 0 | 1.5% | Glutamic acid |
| Ink 1-2 | TiO$_2$ | 234 | 14 | P-2 | 14 | 0 | 1.5% | Glutamic acid |
| Ink 1-3 | TiO$_2$ | 234 | 14 | P-2 | 14 | 0 | 1.5% | Glutamic acid |
| Ink 1-4 | TiO$_2$ | 234 | 14 | P-2 | 14 | 0 | 1.5% | Na dihydrogen phosphate |
| Ink 1-5 | TiO$_2$ | 234 | 14 | P-2 | 14 | 0 | 1.5% | Glutamine |
| Ink 1-6 | TiO$_2$ | 234 | 14 | P-2 | 14 | 0 | 1.5% | Isoleucine |
| Ink 1-7 | TiO$_2$ | 234 | 14 | P-2 | 14 | 0 | 1.5% | Phenylalanine |
| Ink 1-8 | TiO$_2$ | 234 | 14 | P-2 | 14 | 0 | 1.5% | Serine |
| Ink 1-9 | TiO$_2$ | 234 | 14 | P-2 | 14 | 0 | 1.5% | Serine |
| Ink 1-10 | TiO$_2$ | 234 | 14 | P-2 | 14 | 0 | 1.5% | Serine |
| Ink 1-11 | TiO$_2$ | 234 | 14 | P-2 | 14 | 0 | 1.5% | Glutamic acid |
| Ink 1-12 | TiO$_2$ | 220 | 14 | P-3 | 10 | 0 | 10.0% | Glutamic acid |
| Ink 1-13 | CB | 98 | 5 | P-2 | 14 | 0 | 1.5% | Glutamic acid |
| Ink 1-14 | TiO$_2$ | 234 | 14 | P-2 | 14 | 0 | 1.5% | Glutamine |
| Ink 1-15 | TiO$_2$ | 234 | 14 | P-2 | 14 | 40 | 1.5% | Glutamic acid |
| Ink 1-16 | TiO$_2$ | 242 | 14 | P-6 | 0 | 7 | 7.0% | Glutamic acid |
| Ink 1-17 | TiO$_2$ | 238 | 14 | P-7 | 7 | 41 | 10.0% | Glutamic acid |
| Ink 1-18 | TiO$_2$ | 245 | 14 | P-8 | 46 | 0 | 2.5% | Glutamic acid |
| Ink 1-19 | TiO$_2$ | 234 | 14 | P-2 | 14 | 0 | 1.5% | Serine |
| Ink 1-20 | TiO$_2$ | 234 | 14 | P-2 | 14 | 0 | 1.5% | Serine |
| Ink 1-21 | TiO$_2$ | 232 | 14 | P-9 | 14 | 0 | 1.5% | Serine |
| Ink 1-22 | TiO$_2$ | 230 | 14 | P-4 | 64 | 0 | 1.5% | Glutamic acid |
| Ink 1-23 | TiO$_2$ | 234 | 14 | P-2 | 14 | 0 | 0.015 | — |

| | Ampholyte | Metal oxide particles | | | Resin particles | |
|---|---|---|---|---|---|---|
| Ink No. | Content (% by mass) | Type | Content (% by mass) | Particle diameter (nm) | Content (% by mass) | pH |
| Ink 1-1 | 0.07% | — | — | — | 4.0% | 7.9 |
| Ink 1-2 | 0.07% | ZrO$_2$ | 18.5% | 47 | 4.0% | 7.9 |
| Ink 1-3 | 0.07% | — | — | — | — | 7.4 |
| Ink 1-4 | 0.07% | — | — | — | — | 6.0 |
| Ink 1-5 | 0.50% | ZrO$_2$ | 18.5% | 47 | 4.0% | 7.8 |
| Ink 1-6 | 0.50% | ZrO$_2$ | 18.5% | 47 | 4.0% | 8.0 |
| Ink 1-7 | 0.30% | ZrO$_2$ | 18.5% | 47 | 4.0% | 8.1 |
| Ink 1-8 | 0.50% | — | — | — | 4.0% | 7.9 |
| Ink 1-9 | 0.50% | ZrO$_2$ | 18.5% | 47 | 4.0% | 7.9 |
| Ink 1-10 | 0.07% | ZrO$_2$ | 18.5% | 47 | 4.0% | 7.9 |
| Ink 1-11 | 0.07% | Al$_2$O$_3$ | 25% | 13 | 4.0% | 7.7 |
| Ink 1-12 | 0.07% | — | — | — | — | 5.4 |
| Ink 1-13 | 0.07% | — | — | — | 4.0% | 8.1 |
| Ink 1-14 | 1.80% | — | — | — | 4.0% | 8.1 |
| Ink 1-15 | 0.03% | — | — | — | 4.0% | 8.5 |

TABLE 1-continued

| | First ink composition | | | | | |
|---|---|---|---|---|---|---|
| Ink 1-16 | 0.07% | — | — | — | 4.0% | 8.2 |
| Ink 1-17 | 0.07% | — | — | — | 4.0% | 7.9 |
| Ink 1-18 | 0.07% | — | — | — | 4.0% | 8.0 |
| Ink 1-19 | 2.20% | — | — | — | 4.0% | 7.9 |
| Ink 1-20 | 2.00% | — | — | — | 4.0% | 7.9 |
| Ink 1-21 | 0.50% | — | — | — | 4.0% | 7.9 |
| Ink 1-22 | 0.07% | — | — | — | 4.0% | 7.4 |
| Ink 1-23 | 0.00% | — | — | — | 4.0% | 7.9 |

TABLE 2

Second ink composition

| | | Resin containing unneutralized acid group | | |
|---|---|---|---|---|
| Ink No. | Pigment Type | Type | Acid value [Mg KOH/g] | Content [% by mass] | PH |
| Ink 2-1 | PB15:3 | P-1 | 112 | 30 | 8.7 |
| Ink 2-2 | PB15:3 | P-5 | 141 | 30 | 8.2 |
| Ink 2-3 | PB15:3 | P-10 | 20 | 30 | 8.9 |
| Ink 2-4 | PB15:3 | P-4 | 64 | 30 | 8.7 |

TABLE 3

| | | First ink composition | | | | | Resin | Second ink composition |
|---|---|---|---|---|---|---|---|---|
| | | Dispersant | | Ampholyte | | Metal | particles | Type |
| | Ink No. | Acid value [mg KOH/g] | Amine value [mg KOH/g] | Type | Content (% by mass) | oxide particles | Content (% by mass) | Ink No. | Acid value [mg KOH/g] |
| Example 1 | Ink 1-1 | 14 | 0 | Glutamic acid | 0.07% | — | 4.0% | Ink 2-1 | 112 |
| Example 2 | Ink 1-2 | 14 | 0 | Glutamic acid | 0.07% | ZrO$_2$ | 4.0% | Ink 2-1 | 112 |
| Example 3 | Ink 1-3 | 14 | 0 | Glutamic acid | 0.07% | — | — | Ink 2-1 | 112 |
| Example 4 | Ink 1-4 | 14 | 0 | Na dihydrogen phosphate | 0.07% | — | — | Ink 2-1 | 112 |
| Example 5 | Ink 1-5 | 14 | 0 | Glutamine | 0.50% | ZrO$_2$ | 4.0% | Ink 2-1 | 112 |
| Example 6 | Ink 1-6 | 14 | 0 | Isoleucine | 0.50% | ZrO$_2$ | 4.0% | Ink 2-1 | 112 |
| Example 7 | Ink 1-7 | 14 | 0 | Phenylalanine | 0.30% | ZrO$_2$ | 4.0% | Ink 2-1 | 112 |
| Example 8 | Ink 1-8 | 14 | 0 | Serine | 0.50% | ZrO$_2$ | 4.0% | Ink 2-1 | 112 |
| Example 9 | Ink 1-9 | 14 | 0 | Serine | 0.50% | — | 4.0% | Ink 2-1 | 112 |
| Example 10 | Ink 1-10 | 14 | 0 | Serine | 0.07% | ZrO$_2$ | 4.0% | Ink 2-1 | 112 |
| Example 11 | Ink 1-11 | 14 | 0 | Glutamic acid | 0.07% | Al$_2$O$_3$ | 4.0% | Ink 2-1 | 112 |
| Example 12 | Ink 1-12 | 10 | 0 | Glutamic acid | 0.07% | — | — | Ink 2-1 | 112 |
| Example 13 | Ink 1-13 | 14 | 0 | Glutamic acid | 0.07% | — | 4.0% | Ink 2-1 | 112 |
| Example 14 | Ink 1-14 | 14 | 0 | Glutamine | 1.80% | — | 4.0% | Ink 2-1 | 112 |
| Example 15 | Ink 1-1 | 14 | 0 | Glutamic acid | 0.07% | — | 4.0% | Ink 2-1 | 112 |
| Example 16 | Ink 1-15 | 14 | 0 | Glutamic acid | 0.03% | — | 4.0% | Ink 2-1 | 112 |
| Example 17 | Ink 1-1 | 14 | 0 | Glutamic acid | 0.07% | — | 4.0% | Ink 2-1 | 112 |
| Example 18 | Ink 1-1 | 14 | 0 | Glutamic acid | 0.07% | — | 4.0% | Ink 2-2 | 141 |
| Example 19 | Ink 1-16 | 0 | 40 | Glutamic acid | 0.07% | — | 4.0% | Ink 2-1 | 112 |
| Example 20 | Ink 1-17 | 7 | 7 | Glutamic acid | 0.07% | — | 4.0% | Ink 2-1 | 112 |
| Example 21 | Ink 1-18 | 46 | 41 | Glutamic acid | 0.07% | — | 4.0% | Ink 2-1 | 112 |
| Example 22 | Ink 1-19 | 14 | 0 | Serine | 2.20% | — | 4.0% | Ink 2-1 | 112 |
| Example 23 | Ink 1-20 | 14 | 0 | Serine | 2.00% | — | 4.0% | Ink 2-1 | 112 |
| Example 24 | Ink 1-21 | 14 | 0 | Serine | 0.50% | — | 4.0% | Ink 2-1 | 112 |
| Example 25 | Ink 1-8 | 14 | 0 | Serine | 0.50% | — | 4.0% | Ink 2-3 | 20 |
| Example 26 | Ink 1-8 | 14 | 0 | Serine | 0.50% | — | 4.0% | Ink 2-4 | 64 |
| Example 27 | Ink 1-22 | 64 | 0 | Glutamic acid | 0.07% | — | 4.0% | Ink 2-1 | 112 |
| Comparative Example 1 | Ink 1-23 | 14 | 0 | | 0% | — | 4.0% | Ink 2-1 | 112 |

| | Image forming method | | Evaluation | | | | |
|---|---|---|---|---|---|---|---|
| | Drying step | Jetting order | Aggregating property | Storage stability | Adhesiveness | Water resistance | Alcohol resistance |
| Example 1 | Available | First → second | C | B | A | A | A |
| Example 2 | Available | First → second | A | A+ | A | A | A |
| Example 3 | Available | First → second | B | A | C | D | D |
| Example 4 | Available | First → second | A | C | C | D | D |
| Example 5 | Available | First → second | A+ | B | A | A | A |
| Example 6 | Available | First → second | A+ | A | A | A | A |
| Example 7 | Available | First → second | A+ | A | A | A | A |

TABLE 3-continued

| | | | | | | | |
|---|---|---|---|---|---|---|---|
| Example 8 | Available | First → second | B | A | A | A | A |
| Example 9 | Available | First → second | A+ | A | A | A | A |
| Example 10 | Available | First → second | A | A+ | A | A | A |
| Example 11 | Available | First → second | A | A | A | A | A |
| Example 12 | Available | First → second | C | B | C | D | D |
| Example 13 | Available | First → second | C | B | A | A | A |
| Example 14 | Available | First → second | B | B | A | A | A |
| Example 15 | Not available | First → second | C | B | A | A | A |
| Example 16 | Available | First → second | C | A | A | A | A |
| Example 17 | Available | Second → first | D | B | A | A | A |
| Example 18 | Available | First → second | B | B | A | A | A |
| Example 19 | Available | First → second | A | C | B | B | B |
| Example 20 | Available | First → second | A | C | B | B | B |
| Example 21 | Available | First → second | B | C | B | B | B |
| Example 22 | Available | First → second | A | C | B | 8 | B |
| Example 23 | Available | First →second | B | B | A | A | A |
| Example 24 | Available | First → second | B | B | A | A | A |
| Example 25 | Available | First → second | C | A | A | A | A |
| Example 26 | Available | First → second | B | A | A | A | A |
| Example 27 | Available | First → second | D | D | D | C | C |
| Comparative Example 1 | Available | First → second | E | A | A | A | A |

The content of the pigment of the first ink composition in Table 1 is the solid content (% by mass) of the pigment in a case where the total mass of the first ink composition is set to 100% by mass.

The particle diameter of the pigment and the metal oxide particles in the first ink composition in Table 1 is the average primary particle diameter.

The content of the dispersant of the first ink composition in Table 1 is the content (% by mass) of the solid content of the dispersant in a case where the total mass of the pigment contained in the first ink composition is set to 100% by mass.

The content of the ampholyte of the first ink composition in Tables 1 and 3 is the content (% by mass) of the solid content of the ampholyte in a case where the total mass of the first ink composition is set to 100% by mass.

The content of the metal oxide particles of the first ink composition in Table 1 is the content (% by mass) of the solid content of the solid content of the metal oxide particles in a case where the total mass of the pigment contained in the first ink composition is set to 100% by mass.

The content of the resin particles of the first ink composition in Tables 1 and 3 is the content (% by mass) of the solid content of the resin particles in a case where the total mass of the first ink composition is set to 100% by mass.

The content of the resin containing an unneutralized acid group in the second ink composition in Table 2 is the content (% by mass) of the solid content of the resin containing an unneutralized acid group in a case where the total mass of the pigment contained in the second ink composition is set to 100% by mass.

The details of each component listed in Tables 1 to 3 are as follows.

$TiO_2$: titanium dioxide (PF690, manufactured by Ishihara Sangyo Kaisha, Ltd.)
CB: carbon black
PB15:3 (CHROMO FINE BLUE, manufactured by Dainichiseika Color & Chemicals Mfg Co., Ltd.)
Glutamic acid (L-glutamic acid, manufactured by FUJIFILM Wako Pure Chemical Corporation)
Na dihydrogen phosphate: sodium dihydrogen phosphate (sodium dihydrogen phosphate hydrate, manufactured by FUJIFILM Wako Pure Chemical Corporation)
Glutamine (L(+)-glutamine, manufactured by FUJIFILM Wako Pure Chemical Corporation)
Isoleucine (L(+)-isoleucine, manufactured by FUJIFILM Wako Pure Chemical Corporation)
Phenylalanine (L(-)-phenylalanine, manufactured by FUJIFILM Wako Pure Chemical Corporation)
Serine (L-serine, manufactured by FUJIFILM Wako Pure Chemical Corporation)
$ZrO_2$ (ZSL00014, manufactured by Daiichi Kigenso Kagaku Kogyo Co., Ltd.)
$Al_2O_3$: Aluminum oxide (AEROXIDE, manufactured by EVONIK Industries AG)
P-1: a compound synthesized according to the method for synthesizing the dispersant P-1 described below
P-2: ARON (registered trademark) A6330 (manufactured by Toagosei Co., Ltd., solid content: 40% by mass)
P-3: BYK190 (manufactured by BYK Chemie Japan KK, solid content: 40% by mass)
P-4: a compound synthesized according to the method for synthesizing the dispersant P-4 described below
P-5: a compound synthesized according to the method for synthesizing the dispersant P-5 described below
P-6: EFKA (registered trademark) PX4701 (manufactured by BASF SE, solid content: 100% by mass)
P-7: BYK2012 (manufactured by BYK Chemie Japan KK, solid content: 40% by mass)
P-8: BYK ANTI-TERRA-250 (solid content: 70% by mass, manufactured by BYK Chemie Japan KK)
P-9: A6012 (manufactured by Toagosei Co., Ltd., solid content: 40% by mass)
P-10: BYK-2010 (manufactured by BYK Chemie Japan KK, solid content: 40% by mass)

(Synthesis of Dispersant P-1)

The dispersant P-1 was synthesized in the following manner.

605 g of dipropylene glycol was added to a three-neck flask provided with a stirrer and a cooling pipe and heated to 85° C. in a nitrogen atmosphere.

A solution I obtained by mixing 234 g of benzyl methacrylate, 120 g of stearyl methacrylate, 84 g of methacrylic acid, 162 g of hydroxyethyl methacrylate, and 3.93 g of 2-mercaptopropionic acid and a solution II obtained by dissolving 6.2 g of t-butylperoxy-2-ethylhexanoate (Perbutyl O, manufactured by NOF Corporation) in 115 g of dipropylene glycol were respectively prepared. The solution I was added dropwise to the three-neck flask for 4 hours, and the solution II was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of the monomers was confirmed by $^1$H-NMR.

The obtained reaction solution was heated to 70° C., 74 g of dimethylaminoethanol was added thereto as an amine compound, and 764 g of propylene glycol was added thereto, and the resulting solution was stirred, thereby obtaining a solution (solid content: 30% by mass) of the dispersant P-1 having a weight-average molecular weight (Mw) of 30000 and an acid value of 112 mgKOH/g. The constituent components of the obtained polymer were confirmed by $^1$H-NMR.

(Synthesis of Dispersant P-4)

A solution (solid content: 30% by mass) of the dispersant P-4 (weight-average molecular weight (Mw) of 30000, acid value of 64 mgKOH/g) was obtained according to the same method as that for the synthesis of the dispersant P-1 except that the amount of methacrylic acid was changed to 60 g and the amount of hydroxyethyl methacrylate was changed to 186 g.

(Synthesis of Dispersant P-5)

198 g of dipropylene glycol was added to a 2000 ml three-neck flask provided with a stirrer and a cooling pipe and heated to 85° C. in a nitrogen atmosphere.

Further, a solution I was obtained by dissolving 392.40 g of benzyl methacrylate and 107.60 g of methacrylic acid as monomers and 6.75 g of 3-mercaptopropionic acid as a chain transfer agent in 166 g of dipropylene glycol. Further, a solution II was obtained by dissolving 7.96 g of t-butylperoxy-2-ethylhexanoate (Perbutyl O, manufactured by NOF Corporation) was dissolved in 99.5 g of dipropylene glycol. The solution I was added dropwise to the three-neck flask for 4 hours, and the solution II was added dropwise thereto for 5 hours. The dropwise addition of the solution I and the solution II was started simultaneously. The temperature was maintained at 85° C. during the dropwise addition.

After the completion of the dropwise addition, the resulting solution was allowed to further react for 2 hours, heated to 95° C., and heated and stirred for 3 hours so that all unreacted monomers were allowed to react. The temperature was lowered to room temperature to stop the polymerization reaction. The disappearance of the monomers was confirmed by $^1$H-NMR.

The obtained reaction solution was heated to 70° C., 111.6 g of a 50 mass % KOH aqueous solution was added thereto, 107.5 g of dipropylene glycol (DPG) and 75.5 g of pure water were added thereto, and the resulting solution was stirred, thereby obtaining a solution (solid content of 37% by mass) of the dispersant P-5 having a weight-average molecular weight of 80000 and an acid value of 141 mgKOH/g.

As listed in Table 3, in Examples 1 to 27 in which the first ink composition containing a dispersant, a colorant, and an ampholyte and the second ink composition containing a colorant and a resin containing an unneutralized acid group were used, the aggregating property of the colorant contained in the second ink composition was excellent.

In Example 3 in which the ampholyte was an amino acid, the stability wax excellent as compared with Example 4 in which the ampholyte was not an amino acid.

In Example 2 in which the first ink composition had zirconium dioxide having an average primary particle diameter of less than 100 nm as metal oxide particles, the stability was excellent as compared with Example 1 in which the first ink composition did not contain metal oxide particles.

In Example 24 in which the acid value of the resin containing an unneutralized acid group was 50 mgKOH/g or greater, the aggregating property was excellent as compared with Example 25 in which the acid value of the resin containing an unneutralized acid group was less than 50 mgKOH/g.

On the contrary, in Comparative Example 1 in which the first ink composition did not contain an ampholyte, the aggregating property was poor.

EXPLANATION OF REFERENCES

111: 11th stroke
112: 12th stroke

What is claimed is:

1. An ink set comprising:
a first ink composition; and
a second ink composition,
wherein the first ink composition contains water, a dispersant, a colorant, and an ampholyte, and
the second ink composition contains water, a colorant, and a resin containing an unneutralized acid group,
wherein an acid value of the resin containing an unneutralized acid group is greater than an acid value of the dispersant contained in the first ink composition, the acid value of the dispersant contained in the first ink composition is 20 mgKOH/g or less, and
the resin containing an unneutralized acid group contains a resin having an acid value of 110 KOH/g to 200 mgKOH/g, and
wherein, until the first and second ink compositions contact each other, the dispersed components of the first and second ink compositions remain dispersed so long as the first and second ink compositions are isolated from external components having any aggregation function, and
when the first and second ink compositions contact each other, the dispersed components of the first and second ink compositions aggregate without a separate treatment liquid having an aggregation function.

2. The ink set according to claim 1,
wherein the ampholyte contains an amino acid.

3. The ink set according to claim 1,
wherein a content of the ampholyte is in a range of 0.03% by mass to 2.0% by mass with respect to a total mass of the first ink composition.

4. The ink set according to claim 1,
wherein the resin containing an unneutralized acid group is a dispersant containing an unneutralized acid group.

5. The ink set according to claim 1,
wherein the first ink composition further contains metal oxide particles,
an average primary particle diameter of the metal oxide particles is less than 100 nm, and
the metal oxide particles contain at least one metal oxide selected from the group consisting of zirconium dioxide, aluminum oxide, silicon dioxide, zinc oxide, and diiron trioxide.

6. The ink set according to claim 1,
wherein the ink set is used for ink jet recording.

7. An image recording method which is performed using the ink set according to claim 1, the method comprising:
a first ink applying step of applying the first ink composition onto a base material; and
a second ink applying step of applying the second ink composition onto the base material.

8. The image recording method according to claim 7, wherein the second ink applying step is performed after the first ink applying step.

9. The image recording method according to claim 8, further comprising:

a drying step of heating and drying the first ink composition applied, after the first ink applying step and before the second ink applying step.

10. The image recording method according to claim 7, wherein at least one of the first ink applying step or the second ink applying step is a step of applying an ink composition using an ink jet method.

11. The ink set according to claim 1, wherein the first ink composition comprises a white pigment.

* * * * *